US012080235B2

(12) United States Patent
Kubota et al.

(10) Patent No.: US 12,080,235 B2
(45) Date of Patent: Sep. 3, 2024

(54) ELECTRO-OPTICAL DEVICE, ELECTRONIC DEVICE AND METHOD OF DRIVING ELECTRO-OPTICAL DEVICE

(71) Applicant: SEIKO EPSON CORPORATION, Tokyo (JP)

(72) Inventors: Takehiko Kubota, Matsumoto (JP); Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/081,399

(22) Filed: Dec. 14, 2022

(65) Prior Publication Data

US 2023/0186855 A1 Jun. 15, 2023

(30) Foreign Application Priority Data

Dec. 15, 2021 (JP) ................................ 2021-203161

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2310/0202* (2013.01); *G09G 2310/08* (2013.01); *G09G 2320/0238* (2013.01); *G09G 2320/045* (2013.01)

(58) Field of Classification Search
None
See application file for complete search history.

(56) References Cited

U.S. PATENT DOCUMENTS

2004/0108518 A1* 6/2004 Jo ........................ G09G 3/3233 257/200
2005/0264228 A1* 12/2005 Kim .................... H01L 27/1255 257/E27.113
2007/0296671 A1* 12/2007 Han ..................... G09G 3/3233 345/92
2008/0036706 A1 2/2008 Kitazawa
2008/0048955 A1* 2/2008 Yumoto ............... G09G 3/3233 345/82
2008/0088546 A1* 4/2008 Takasugi .............. G09G 3/3233 345/76
2008/0180422 A1* 7/2008 Kusafuka ............. G09G 3/3283 345/204

(Continued)

FOREIGN PATENT DOCUMENTS

JP 2008-040326 A 2/2008
JP 2010-217661 A 9/2010

(Continued)

*Primary Examiner* — Dorothy Harris
(74) *Attorney, Agent, or Firm* — Oliff PLC

(57) ABSTRACT

A pixel circuit provided corresponding to a scanning line and a data line includes a transistor and an OLED serving as one example of a light emitting element. In a compensation period, a gate node and a drain node of the transistor are electrically coupled to each other to cause a voltage of the gate node of the transistor to be a voltage corresponding to a threshold voltage. In the gate writing period, a voltage of the gate node of the transistor is varied from a voltage corresponding to the threshold voltage into a voltage corresponding to luminance of the OLED, and the voltage corresponding to luminance of the OLED is applied to the drain node of the transistor.

6 Claims, 27 Drawing Sheets

(56) References Cited

U.S. PATENT DOCUMENTS

2008/0284719 A1* 11/2008 Yoshida ................ G02F 1/1368 349/37
2010/0259527 A1* 10/2010 Odawara .............. G09G 3/3233 345/76
2011/0205206 A1* 8/2011 Yoo ...................... G09G 3/3275 345/82
2012/0127221 A1 5/2012 Tamaki et al.
2013/0093653 A1* 4/2013 Ota ...................... G09G 3/2096 345/76
2013/0093737 A1* 4/2013 Ota ...................... G09G 3/3275 345/204
2013/0215158 A1* 8/2013 Fujita ................... G09G 3/3291 345/77
2013/0278167 A1 10/2013 Yamamoto
2014/0340436 A1* 11/2014 Kumeta ............... G09G 3/3233 345/691
2014/0375533 A1* 12/2014 Kim ..................... G09G 3/3233 345/78
2018/0261155 A1 9/2018 Ota
2019/0012948 A1* 1/2019 Ohara .................. G09G 3/3258
2021/0225990 A1* 7/2021 Kodama ............ H10K 59/1213
2023/0101721 A1* 3/2023 Kodama .............. G09G 3/3233 345/212

FOREIGN PATENT DOCUMENTS

JP 2010-243560 A 10/2010
JP 2012-128407 A 7/2012
JP 2018-151506 A 9/2018
JP 2021-015211 A 2/2021
JP 2021-113864 A 8/2021

* cited by examiner

ELECTRO-OPTICAL DEVICE, ELECTRONIC DEVICE AND METHOD OF DRIVING ELECTRO-OPTICAL DEVICE

The present application is based on, and claims priority from JP Application Serial Number 2021-203161, filed on Dec. 15, 2021, the disclosure of which is hereby incorporated by reference herein in its entirety.

BACKGROUND

1. Technical Field

The present disclosure relates to an electro-optical device, an electronic device and a method of driving an electro-optical device.

2. Related Art

An electro-optical device using a light emitting element such as an OLED is known. The OLED stands for an organic light emitting diode. The electro-optical device includes a pixel circuit. The pixel circuit is provided corresponding to each pixel of an image to be displayed, and includes, for example, a light emitting element and a transistor configured to supply electric current corresponding to a gray scale level to the light emitting element.

Incidentally, when capacitance is parasitized at a drain node of the transistor configured to supply electric current to the light emitting element, electric charge (leak current) left at this parasitic capacitor flows through the light emitting element, which produces a phenomenon in which light is slightly emitted. In some cases, this phenomenon is called floating black because, even when the gray scale level is zero, the OLED emits light and is visually recognized as black being floating.

For this reason, there is proposed a technique of resetting electric charges left at the drain node of the transistor before an electric current is supplied to the light emitting element (see, for example, JP-A-2010-243560).

However, as the size of the space further reduces and the resolution further increases, adjacent pixel circuits are brought closer to each other. When a technique of preventing the floating black as described in JP-A-2010-243560 is applied in a state in which pixel circuits are close to each other, there is a problem in that the luminance at the adjacent pixel circuits are influenced, which results in a deterioration in the display quality.

SUMMARY

An electro-optical device according to one aspect of the present disclosure includes a pixel circuit provided corresponding to a scanning line and a data line, in which the pixel circuit includes a first transistor and a light emitting element, the first transistor is configured to supply the light emitting element with a current corresponding to a voltage between a gate node of the first transistor and a source node of the first transistor, a horizontal scanning period in which the scanning line is selected sequentially includes a compensation period, a first period, and a second period, in the compensation period, the gate node of the first transistor and a drain node of the first transistor are electrically coupled, and the gate node of the first transistor has a voltage corresponding to a threshold voltage of the first transistor, in the first period, a voltage of the gate node of the first transistor is varied from the voltage corresponding to the threshold voltage to a voltage corresponding to luminance of the light emitting element, in the second period, the voltage corresponding to the luminance of the light emitting element is applied to the drain node of the first transistor, and in a light emission period after the second period, the first transistor is caused to supply the light emitting element with a current corresponding to a voltage between the gate node of the first transistor and a source node of the first transistor.

DESCRIPTION OF EXEMPLARY EMBODIMENTS

Below, an electro-optical device according to embodiment of the present disclosure will be described with reference to the drawings. Note that, in each of the drawings, dimensions and scale of each part are appropriately different from actual ones. In addition, the embodiment described below is a preferred specific example, and various technically preferable limitations are applied. However, the scope of the disclosure is not limited to these modes unless they are specifically described in the following description as limiting the disclosure.

First Embodiment

Figure 1:
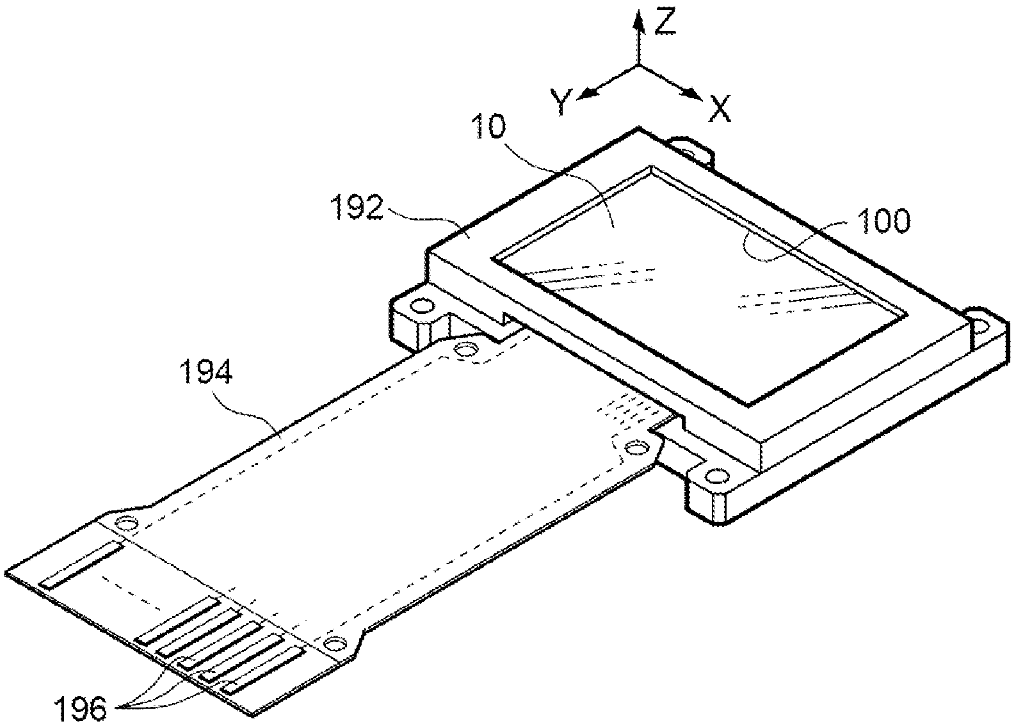
FIG. 1 is a perspective view illustrating an electro-optical device according to a first embodiment.

FIG. 1 is a perspective view illustrating an electro-optical device 10 according to a first embodiment. The electro-optical device 10 is, for example, a micro display panel configured to display an image in a head-mounted display or the like. The electro-optical device 10 includes a plurality of pixel circuits, a driving circuit configured to drive the pixel circuits, and the like. The pixel circuits and the driving circuit are integrated at a semiconductor substrate. The semiconductor substrate is typically a silicon substrate but may be other semiconductor substrates.

The electro-optical device 10 is accommodated in a case 192 having a frame shape and opened so as to correspond to a display region 100. The electro-optical device 10 is coupled to one end of an FPC substrate 194. Note that the FPC stands for a flexible printed circuit. A plurality of terminals 196 configured to be coupled to a host device, which is not illustrated, are provided at the other end of the FPC substrate 194. When the plurality of terminals 196 are coupled to the host device, the electro-optical device 10 is supplied with video data or a synchronization signal from the host device through the FPC substrate 194.

Note that, in the drawings, the X direction indicates a direction in which scanning lines in the electro-optical device 10 extend and indicates a horizontal direction at a display screen. In addition, the Y direction indicates a direction in which data lines extend and indicates a vertical direction at the display screen. The two-dimensional plane defined by the X direction and the Y direction is a substrate surface of the semiconductor substrate. The Z direction is perpendicular to the X direction and the Y direction, and indicates a direction in which light emitted from a light emitting element (OLED) is outputted.

Figure 2:
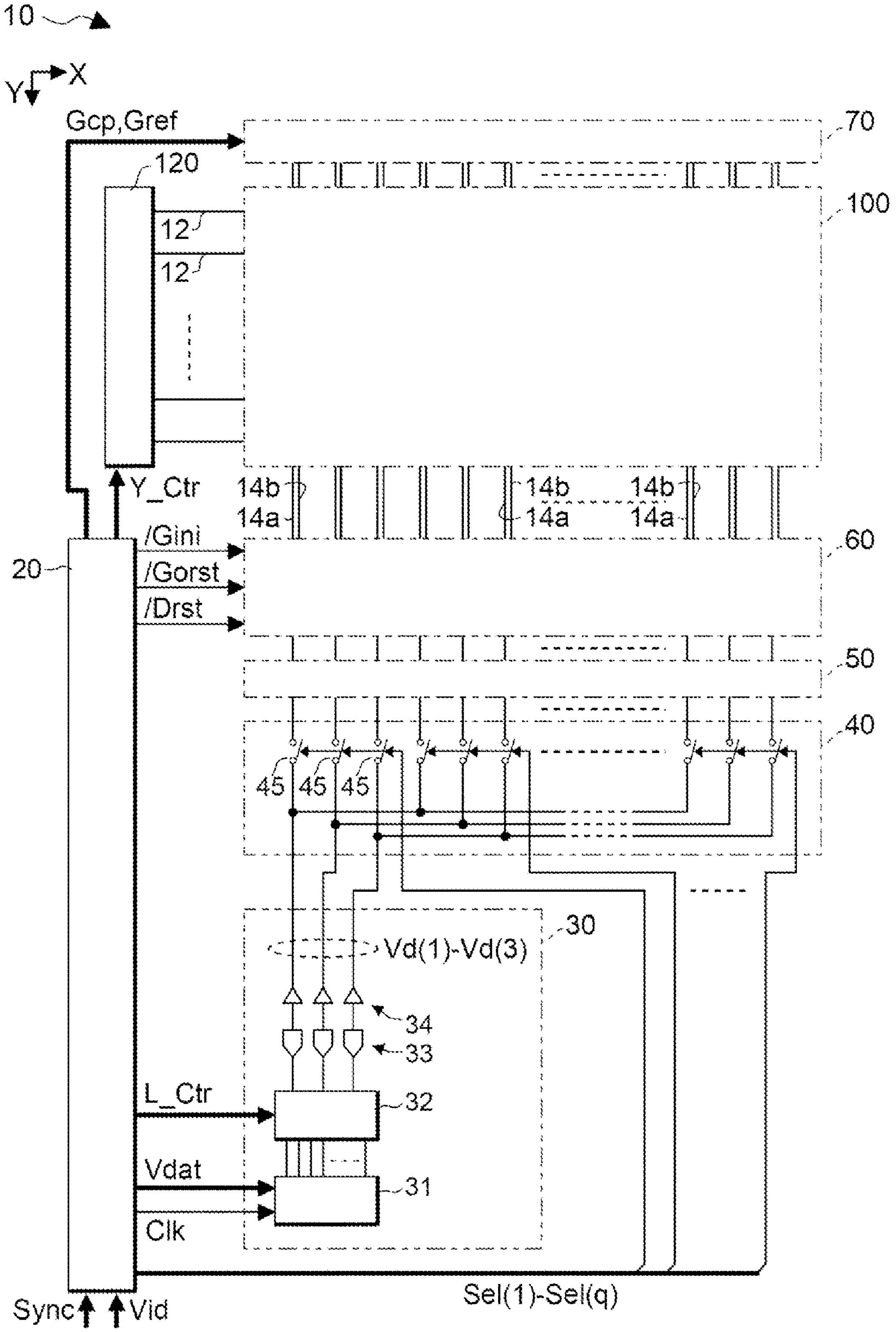
FIG. 2 is a block diagram illustrating an electrical configuration of the electro-optical device.
Figure 3:
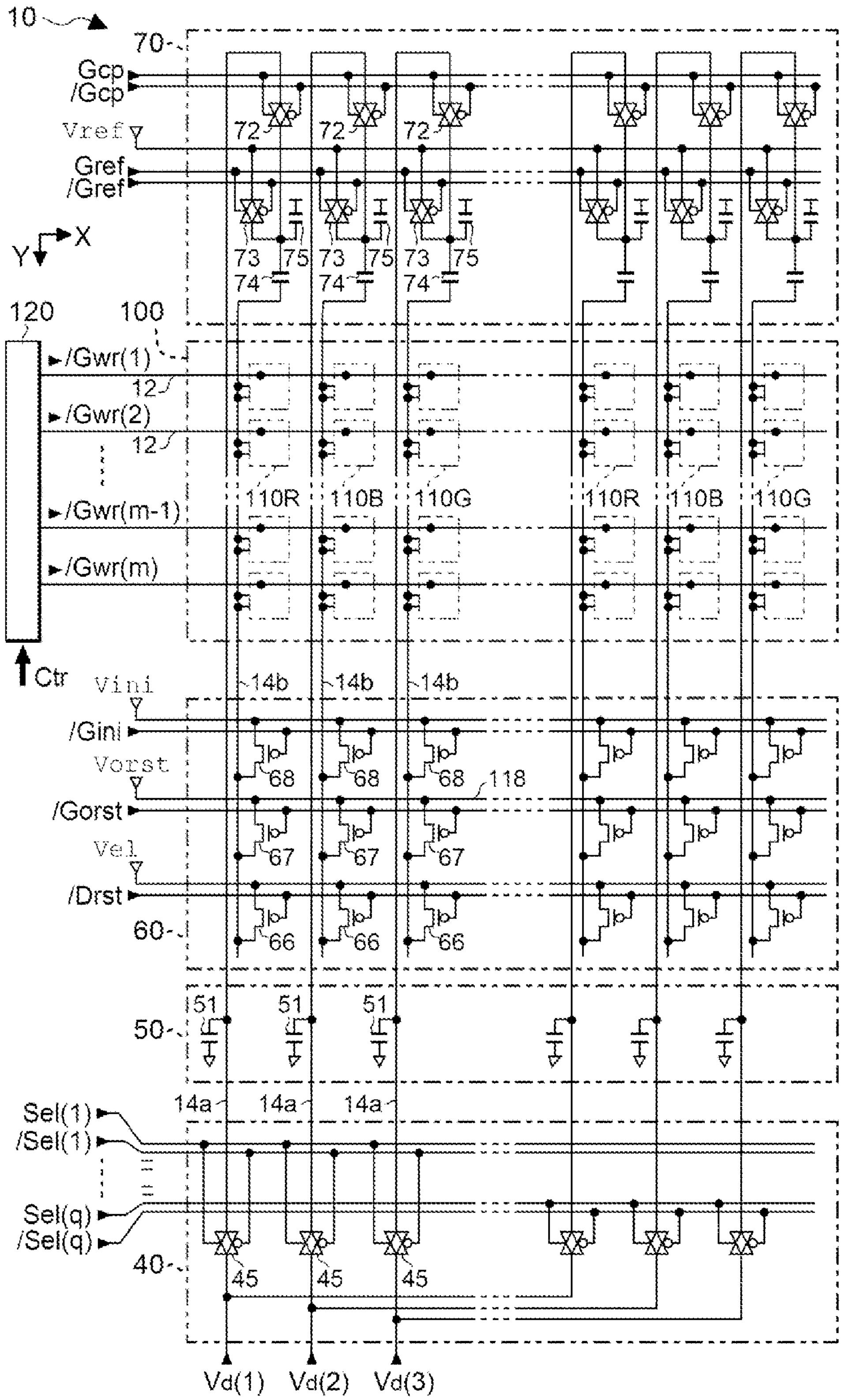
FIG. 3 is a circuit diagram illustrating a portion of the electro-optical device.

FIG. 2 is a block diagram illustrating an electrical configuration of the electro-optical device 10. FIG. 3 is a diagram illustrating the main components of the electro-optical device 10.

As illustrated in FIG. 2, the electro-optical device 10 includes a control circuit 20, a data-signal outputting circuit 30, a switch group 40, a capacitance element group 50, an initialization circuit 60, an auxiliary circuit 70, the display region 100, and a scanning line drive circuit 120.

As illustrated in FIG. 3, in the electro-optical device 10, m rows of scanning lines 12 are provided along the X direction in the drawing, and (3q) columns of data lines 14*b* are provided along the Y direction so as to maintain electrical insulation from each of the scanning lines 12. Each of the "m" and the "q" is an integer equal to or more than 2.

Each row of the scanning lines 12 is referred to as the first, second, third, . . . , (m−1)-th, or m-th row in the order from the top in the drawing, for the purpose of distinguishing individual rows. In order to make explanation in a generalized manner without specifying individual rows, the scanning line 12 may be referred to as an "i-th row" using an integer i not less than 1 and not more than "m".

In addition, in order to distinguish individual columns of the data lines 14*b*, each column of the data lines 14*b* is referred to as the first, second, third, . . . , (3q−2)-th, (3q−1)-th, or (3q)-th column in the order from the left in the drawing. Note that the data lines 14*b* are grouped for each three column in FIGS. 2 and 3. When an integer j not less than 1 and not more than q is used to explain the groups in a generalized manner, data lines 14*b* in three columns of the (3j−2)-th column, the (3j−1)-th column, and the (3j)-th column belong to the j-th group counted from the left.

Pixel circuits 110R, 110B, and 110G are provided corresponding to m rows of scanning lines 12 and (3q) columns of data lines 14*b*.

Specifically, a pixel circuit 110R is provided corresponding to an intersection of a scanning line 12 at the i-th row and a data line 14*b* at the (3j−2)-th column. A pixel circuit 110B is provided corresponding to an intersection of a scanning line 12 at the i-th row and a data line 14*b* at the (3j−1)-th column. A pixel circuit 110G is provided corresponding to an intersection of a scanning line 12 at the i-th row and a data line 14*b* at the (3j)-th column.

The pixel circuit 110R includes a light emitting element configured to output light containing a red color component. The pixel circuit 110B includes a light emitting element configured to output light containing a blue color component. The pixel circuit 110G includes a light emitting element configured to output light containing a green color component. One color is represented through additive color mixing of lights outputted from pixel circuits 110R, 110B, and 110G disposed adjacent to each other and at the same row.

Thus, the present embodiment displays an image in which each one color pixel is arrayed in a matrix of m rows (vertical direction)×q columns (horizontal direction).

Of one color pixel, the red component, the blue component, and the green component are sequentially represented by the pixel circuits 110R, 110B, and 110G. Thus, each of the pixel circuits 110R, 110B, and 110G might be called a sub pixel circuit in the strict sense. However, in the present description, these circuits are referred to as pixel circuits for the purpose of convenience.

In the embodiment, the array (i rows×q columns) of color pixels represented by the pixel circuits 110R, 110B, and 110G matches the array of color pixels that should be displayed in an image. Note that, unlike the configuration described above, it may be possible to employ a configuration in which the array of color pixels represented by the pixel circuits do not match the array of color pixels that should be displayed in an image.

In addition, when the pixel circuits 110R, 110B, and 110G are explained in a generalized manner without specifying any color, description will be made by using 110 as the reference character of the pixel circuit. Note that the region where the pixel circuits 110R, 110B, and 110G are arrayed is one example of the display region 100.

In FIG. 2, the control circuit 20 controls each component on the basis of video data Vid and a synchronization signal Sync, each of which is outputted from a host device. The video data Vid supplied in synchronization with the synchronization signal Sync designates a gray scale level of a pixel in an image to be displayed, for example, by 8 bits for each of red (R), blue (B), and green (G). In addition, the synchronization signal Sync contains a vertical synchronization signal used to give an instruction to start vertical scanning of the video data Vid, a horizontal synchronization signal used to given an instruction to start horizontal scanning, and a dot clock signal indicating timing for one pixel of the video data.

In order to control each component, the control circuit 20 generates control signals Gcp, Gref, Y_Ctr, /Gini, /Gorst, /Drst, L_Ctr, and Sel(1) to Sel(q), and a clock signal Clk. Although not illustrated in FIG. 2, the control circuit 20 outputs a control signal /Gcp having a relationship of logical inversion with the control signal Gcp, a control signal /Gref having a relationship of logical inversion with the control signal Gref, and control signals /Sel(1) to /Sel(q) having a relationship of logical inversion with the Sel(1) to Sel(q).

Note that these control signals are logic signals. The symbol "/" at the beginning of the reference character of each of these control signals indicates that this control signal is negative logic that makes an active state at an L level and makes a non-active state at an H level. A control signal having no symbol "/" at the beginning indicates that the control signal is positive logic that makes a non-active state at an L level and makes an active state at an H level.

In addition, for the control signal, the L level is 0 V that is a reference of zero voltage, and the H level is, for example, 6.0 V.

In the present description, a voltage at a certain point represents a difference in a potential at the certain point relative to the grounding potential that is at the L level of a logic signal, unless otherwise specified. As for the other cases, a voltage at a certain point may be, for example, a threshold voltage of a transistor that will be described later, or a retention voltage of a capacitance element.

The property of luminance of a gray scale level indicated by the video data Vid supplied from the host device does not always match the property of luminance at the OLED included in the pixel circuit 110. Thus, the control circuit 20 converts 8 bits of the video data Vid to increase, for example, to 10 bits, and outputs it as video data Vdat, in order to cause the OLED to emit light with luminance corresponding to the gray scale level indicated by the video data Vid. For this reason, the 10-bit video data Vdat is data corresponding to the gray scale level designated by the video data Vid.

Note that, in this up-conversion, a look-up table is used. The look-up table stores, in advance, a corresponding relationship between 8-bit video data Vid serving as input and 10-bit video data Vdat serving as output.

The scanning line drive circuit 120 is a circuit configured to drive, one row by one row, the pixel circuits 110 arrayed in m rows and (3q) columns in accordance with the control signal Y_Ctr.

The data-signal outputting circuit 30 outputs a data signal toward the data line 14*b*. Specifically, the data-signal outputting circuit 30 outputs a data signal having a voltage corresponding to a gray scale of a pixel represented by the pixel circuit 110.

Note that, in the embodiment, the amplitude of a voltage of the data signal outputted from the data-signal outputting circuit 30 is compressed and is supplied to the data line 14*b*. Thus, the data signal after compression is also a voltage corresponding to the gray scale level of the pixel.

In addition, the data-signal outputting circuit 30 has a function of parallel conversion in which the video data Vdat supplied as serial is converted into a plurality of phases (in this example, "three" phases corresponding to the number of columns of data lines 14*b* that constitute a group) and is outputted.

The data-signal outputting circuit 30 includes a shift register 31, a latching circuit 32, a D/A converter circuit group 33, and an amplifier group 34.

The shift register 31 sequentially transfers the video data Vdat supplied as serial in synchronization with the clock signal Clk, and stores it for one row, that is, for (3q) pieces in terms of the number of pixel circuits.

The latching circuit 32 latches (3q) pieces of video data Vdat stored in the shift register 31 in accordance with the control signal L_Ctr, and parallel converts the latched video data Vdat into three phases in accordance with the control signal L_Ctr.

The D/A converter circuit group 33 includes three digital to analog (D/A) converters. With the three D/A converters, three phases of video data Vdat outputted from the latching circuit 32 are converted into an analog signal.

The amplifier group 34 includes three amplifiers. With the three amplifiers, the three phases of analog signals outputted from the D/A converter circuit group 33 are amplified, and are outputted as data signals Vd(1), Vd(2), and Vd(3).

In a compensation period prior to a gate writing period as described later, the control circuit 20 outputs the control signals Sel(1) to Sel(q) that sequentially exclusively become the H level.

Note that, as for the configuration of the D/A converter circuit, it may be possible to employ, for example, a configuration in which a switch and a capacitance element are provided corresponding to each bit, and charging and discharging of the capacitance element is controlled using the switch so as to correspond to each bit. In addition, depending on the configuration of the data-signal outputting circuit 30, the amplifier group 34 does not necessarily need to be provided. For example, as for the configuration of the D/A converter circuit, the amplifier group 34 may not be provided if a switch and a capacitance element are provided corresponding to each bit, and charging and discharging of the capacitance element is controlled using the switch so as to correspond to each bit.

In accordance with the control signal Y_Ctr, the scanning line drive circuit 120 generates a scanning signal used to sequentially scan the scanning line 12 one row by one row. Here, scanning signals supplied to the scanning lines 12 in the first, second, third, . . . , (m−1)-th, and m-th rows are denoted by /Gwr(1), /Gwr(2), . . . , /Gwr(m−1), and /Gwr(m), respectively. The scanning signal supplied to the scanning line 12 in the i-th row is denoted by /Gwr(i).

Note that, in addition to the scanning signals /Gwr(1) to /Gwr(m), the scanning line drive circuit 120 generates control signals in synchronization with the scanning signals for each of the rows, and supplies them to the display region 100. However, these are not illustrated in FIGS. 2 and 3.

The electro-optical device 10 includes a data transfer line 14*a* provided corresponding to the data line 14*b*. The switch group 40 is a collective body of transmission gates 45 each provided for each of the data transfer line 14*a*.

Of these transmission gates 45, input terminals of q pieces of transmission gates 45 corresponding to data transfer lines 14*a* in the first, fourth, seventh, . . . , and (3q−2)-th columns are coupled commonly. Note that these input terminals are supplied with data signals Vd(1) for each pixel on a time series basis.

In addition, input terminals of q pieces of transmission gates 45 corresponding to data transfer lines 14*a* in the second, fifth, eighth, . . . , and (3q−1)-th columns are coupled commonly. These input terminals are supplied with data signals Vd(2) for each pixel on a time series basis.

Similarly, input terminals of q pieces of transmission gates 45 corresponding to data transfer lines 14*a* in the third, sixth, ninth, . . . , and (3q)-th columns are coupled commonly. These input terminals are supplied with data signals Vd(3) for each pixel on a time series basis.

An output terminal of a transmission gate 45 in a certain one column is coupled to one end of the data transfer line 14*a* in this column.

Three transmission gates 45 corresponding to the (3j−2)-th, (3j−1)-th, and (3j)-th columns that belong to the j-th group are brought into the ON state when the control signal Sel(j) is at the H level (when the control signal /Sel(j) is at the L level), and are brought into the OFF state when the control signal Sel(j) is at the L level (when the control signal /Sel(j) is at the H level).

Note that, in FIG. 3, only the first group and the q-th group are illustrated due to restriction of the paper surface, and other groups are not illustrated. In addition, in FIG. 2, the transmission gates 45 in FIG. 3 are each simply illustrated as a switch in a simplified manner.

In the present description, the "ON state" of the switch, the transistor, or the transmission gate represents a state in which both ends of the switch, a source node, and a drain node of the transistor, or an input terminal and an output terminal of the transmission gate are electrically coupled to each other and are brought into a low impedance state. In addition, the "OFF state" of the switch, the transistor, or the transmission gate represents a state in which both ends of the switching, a source node, and a drain node, or both ends of the transmission gate are not electrically coupled to each other and are brought into a high impedance state.

Furthermore, the expression "electrically couple" in the present description means direct or indirect coupling or connecting of two or more elements.

The capacitance element group 50 is a collective body of capacitance elements 51 each provided for each of the data transfer lines 14*a*. Here, one end of a capacitance element 51 corresponding to a data transfer line 14*a* in a certain column is coupled to one end of the data transfer line 14*a*, and the other end of the capacitance element 51 is coupled to the ground having a certain constant potential, for example, having a potential that is a reference of zero voltage.

The initialization circuit 60 is a collective body of P-channel MOS type transistors 66, 67, and 68 each provided for each of the data lines 14*b*. Note that the MOS stands for a metal-oxide-semiconductor field-effect transistor.

The control signal /Drst is supplied to a gate node of a transistor 66 corresponding to a data line 14*b* in a certain one column. A voltage Vel is applied to a source node of this transistor 66. The drain node of this transistor 66 is coupled to the data line 14*b* in this column. Furthermore, the control signal /Gorst is supplied to a gate node of the transistor 67 corresponding to a data line 14*b* in a certain one column. A reset voltage Vorst is applied through a power supplying line 118 to a source node of the transistor 67. A drain node of this transistor 67 is coupled to the data line 14*b* in this column.

In addition, the control signal /Gini is supplied to a gate node of the transistor 68 corresponding to a data line 14*b* in a certain one column. A voltage Vini is applied to a source node of the transistor 68. A drain node of this transistor 68 is coupled to the data line 14*b* in this column.

The auxiliary circuit 70 is a collective body including transmission gates 72 and 73 each provided for each of the columns and capacitance elements 74 and 75 each provided for each of the columns.

Here, a transmission gate 72 corresponding to a certain one column is in the ON state when the control signal Gcp is at the H level (when the control signal /Gcp is at the L level), and is in the OFF state when the control signal Gcp is at the L level (when the control signal /Gcp is at the H level).

An input terminal of a transmission gate 72 in a certain one column is coupled to the other end of the data transfer line 14*a* in this column. An output terminal of the transmission gate 72 corresponding to this column is coupled to an output terminal of a transmission gate 73 corresponding to this column, one end of a capacitance element 74 corresponding to this column, and one end of a capacitance element 75 corresponding to this column.

A transmission gate 73 corresponding to a certain one column is in the ON state when the control signal Gref is at the H level (when the control signal /Gref is at the L level), and is in the OFF state when the control signal Gref is at the L level (when the control signal /Gref is at the H level).

A voltage Vref is commonly applied to an input terminal of the transmission gate 73 in each of the columns.

In addition, the other end of the capacitance element 75 corresponding to a certain one column is coupled to the ground having a certain constant potential, for example, having a potential that is a reference of zero voltage.

The other end of the capacitance element 74 corresponding to a certain one column is coupled to one end of the data line 14*b* corresponding to this column.

In the first embodiment, one end of the data transfer line 14*a* is coupled to the output terminal of the transmission gate 45 and one end of the capacitance element 51. The other end of the data transfer line 14*a* is coupled to an input terminal of the transmission gate 72. The display region 100 is disposed between the switch group 40 and the auxiliary circuit 70, and hence, the data transfer line 14*a* passes through the display region 100.

On the other hand, a data signal supplied through the transmission gate 45 to the data transfer line 14*a* is supplied as a data signal to the pixel circuit 110 through the transmission gate 72, the capacitance element 74, and the data line 14*b*.

Thus, a data signal outputted from the data-signal outputting circuit 30 passes through the data transfer line 14*a*, reaches the auxiliary circuit 70 disposed at the opposite side of the display region 100, turns around, passes through the capacitance element 74, and is supplied to the pixel circuit 110 through the data line 14*b*.

In such a configuration, a region where the capacitance element 74 is provided and the data-signal outputting circuit 30 are disposed so as to interpose the display region 100 between them. This makes it possible to prevent elements from concentrating on a region where the data-signal outputting circuit 30 when the display region 100 is used as a reference. The display region 100 needs to be spaced apart from four sides to some degree, and even in a region where the data-signal outputting circuit 30 is not provided, a certain degree of distance from the sides needs to be provided. When elements concentrate on the data-signal outputting circuit 30 and its surroundings, the area required for this region increases, which possibly serves as a factor that inhibits the miniaturization. In contrast, in a case of the configuration as described in the first embodiment, the area required for this region reduces, which makes it possible to reduce the size.

Figure 4:
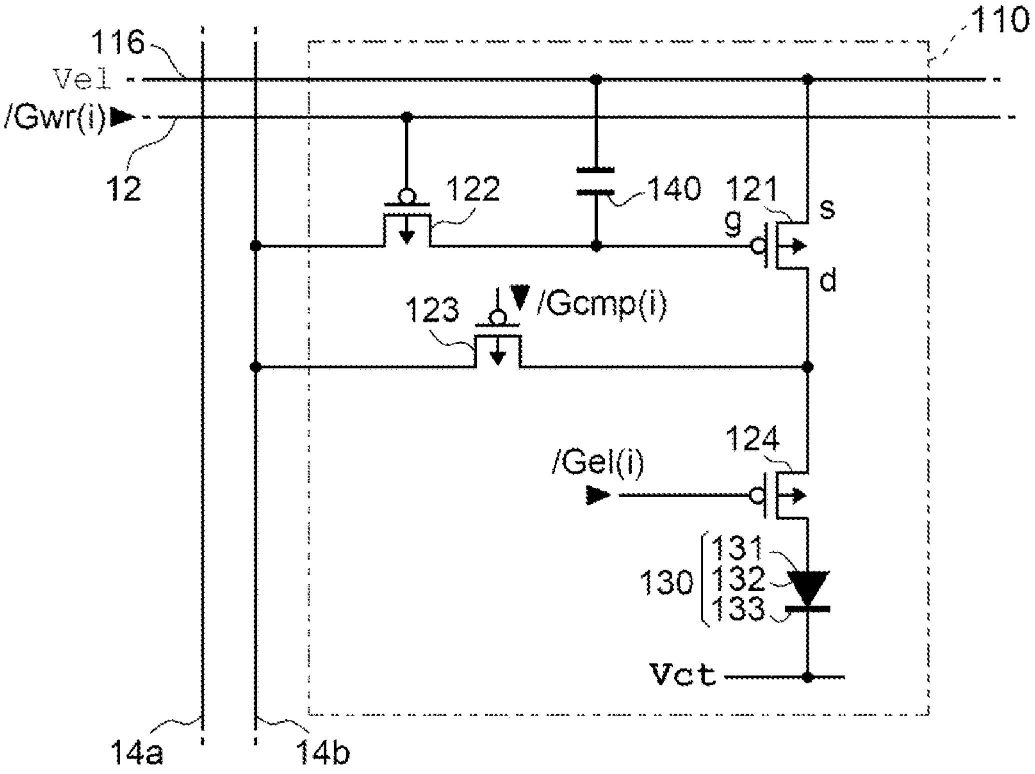
FIG. 4 is a diagram illustrating a pixel circuit in the electro-optical device.

FIG. 4 is a diagram illustrating the configuration of the pixel circuit 110. Pixel circuits 110 arrayed in m rows and (3q) columns are equal to each other from the electrical viewpoint. Thus, the pixel circuits 110 will be described by using one pixel circuit 110 in the i-th row and a given column as a representative.

As illustrated in the drawing, the pixel circuit 110 includes P-channel MOS type transistors 121 to 124, the OLED 130, and a capacitance element 140.

Furthermore, in addition to the scanning signal /Gwr(i), the control signals /Gcmp(i) and /Gel(i) are supplied to the pixel circuit 110 in the i-th row from the scanning line drive circuit 120.

The OLED 130 is a light emitting element in which a light emitting layer 132 is interposed between a pixel electrode 131 and a common electrode 133. The pixel electrode 131 functions as an anode, and the common electrode 133 functions as a cathode. Note that the common electrode 133 has a light reflective property and optical transparency. In the OLED 130, as an electric current flows from the anode toward the cathode, positive holes injected from the anode and electrons injected from the cathode are recombined in the light emitting layer 132 to generate excitons, whereby white light is generated.

In the embodiment, the generated white light resonates, for example, at an optical resonator (not illustrated) including a reflection layer and a semi-reflective semitransparent layer, and is outputted so as to have a resonance wavelength set so as to correspond to any one color of R (red), G (green), and B (blue). A color filter corresponding to the color is provided at the light output side of the optical resonator. Thus, the light outputted from the OLED 130 passes through coloring by the optical resonator and the color filter, and is visually recognized by an observer. Note that the optical resonator is not illustrated in the drawing. In addition, when the electro-optical device 10 simply displays a single-color image representing only brightness and darkness, the color filter described above is not provided.

The transistor 121 is configured such that the gate node g is coupled to the drain node of the transistor 122, the source node s is coupled to a power supplying line 116 having a voltage Vel, and the drain node d is coupled to the source node of the transistor 123 and the source node of the transistor 124. Note that the capacitance element 140 is configured such that one end thereof is coupled to the gate node g of the transistor 121, and the other end thereof is coupled to the power supplying line 116 having a constant voltage, for example, having the voltage Vel. Thus, the capacitance element 140 holds a voltage of the gate node g of the transistor 121.

Note that, as for the capacitance element 140, it may be possible to use, for example, a capacitor parasitized at the gate node g of the transistor 121, or use a capacitor formed by interposing an insulating layer between conductive layers differing from each other at a silicon substrate.

At the transistor 122 of a pixel circuit 110 disposed at the i-th row and a given one column, the gate node thereof is coupled to the scanning line 12 in the i-th row, and the source node thereof is coupled to the data line 14*b* in this column.

At the transistor 123 of the pixel circuit 110 disposed at the i-th row and a given one column, the control signal /Gcmp(i) is supplied to the gate node thereof, and the drain node thereof is coupled to the data line 14*b* in this column.

At the transistor 124 of the pixel circuit 110 disposed at the i-th row and a given one column, the control signal /Gel(i) is supplied to the gate node thereof, and the drain node thereof is coupled to the pixel electrode 131 that is an anode of the OLED 130.

Note that the common electrode 133 functioning as a cathode of the OLED 130 is coupled to a power supplying line of a voltage Vct. In addition, the electro-optical device 10 is formed at a silicon substrate, and hence, a substrate potential of the transistors 121 to 124 are set to be, for example, a potential corresponding to the voltage Vel.

Figure 5:
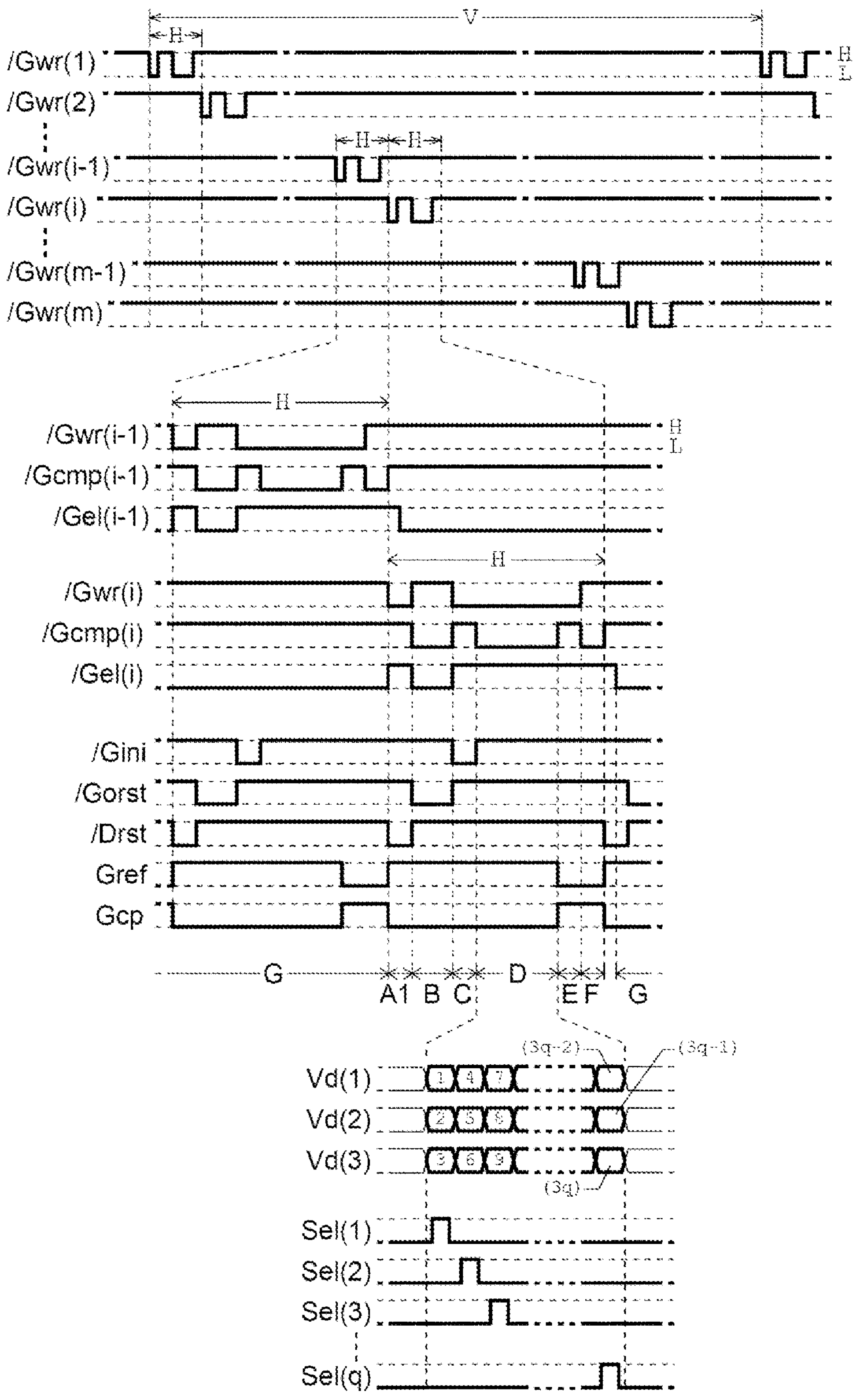
FIG. 5 is a timing chart illustrating operation of the electro-optical device.

FIG. 5 is a timing chart used to explain operation of the electro-optical device 10.

In the electro-optical device 10, horizontal scanning is performed in the order of the first, second, third, . . . , and m-th rows during a period of one frame (V).

Note that, in the present description, the "period of one frame (V)" represents a period required to display one frame of an image designated by the video data Vid. When the length of a period of one frame is equal to a vertical synchronization period and the frequency of the vertical synchronization signal contained in the synchronization signal Sync is, for example, 60 Hz, the length of a period of one frame is 16.7 milliseconds corresponding to one cycle of this vertical synchronization signal. Furthermore, a period required to perform horizontal scanning for one row is a horizontal scanning period (H). Note that, in FIGS. 5 and 6, the vertical scale indicating voltages does not necessarily aligns throughout the individual signals.

In the horizontal scanning period (H), operations of the pixel circuits 110 are almost equal in each of the rows. In addition, operations of pixel circuits 110 in the first to (3q)-th columns in a row for which scanning are performed in a certain horizontal scanning period (H) are also almost equal. Thus, description will be made below by mainly using a pixel circuit 110 at the i-th row and the (3j−2)-the column.

In the electro-optical device 10, the horizontal scanning period (H) is divided into six periods in the order of time: initialization periods (A1), (B), and (C), a compensation period (D), a gate writing period (E), and a drain writing period (F). In addition, from the viewpoint of operation of the pixel circuit 110, a light emission period (G) is added to the six periods described above.

Of the initialization periods (A1), (B), and (C), the initialization period (A1) is a period for setting the transistor 121 to the OFF state. The initialization period (B) is a process for resetting a potential at the anode of the OLED 130. The initialization period (C) is a period in which a voltage that causes the transistor 121 to be brought into the ON state at the beginning of the compensation period (D) is applied to the gate node g.

The compensation period (D) is a period in which the voltage at the gate node g of the transistor 121 converges on a voltage corresponding to the threshold voltage of this transistor 121.

The gate writing period (E) is a period in which a voltage corresponding to a gray scale level is written in the gate node g of the transistor 121, and more specifically, is a period in which the voltage of the gate node g of this transistor 121 is changed from a voltage corresponding to the threshold voltage by a voltage corresponding to the electric current caused to flow in the OLED 130.

The drain writing period (F) is a period in which a voltage written in the gate node g of the transistor 121 in the gate writing period is written in the drain node d of this transistor 121.

Of each of the horizontal scanning periods (H), in the initialization period (A1), the control signals /Gini and /Gorst are at the H level, the control signal /Drst is at the L level, the control signal Gref is at the H level, and the control signal Gcp is at the L level. Thus, the transistor 68 is in the the OFF state. The transistor 67 is in the OFF state. The transistor 66 is in the ON state. The transmission gate 73 is in the ON state. The transmission gate 72 is in the OFF state.

In addition, in the initialization period (A1) of the horizontal scanning period (H) in which the i-th row is selected, the scanning signal /Gwr(i) is at the L level, the control signal /Gcmp(i) is at the H level, and the control signal /Gel(i) is at the H level. Thus, at this pixel circuit 110, the transistor 122 is in the ON state, and the transistors 123 and 124 are in the OFF state.

Figure 6:
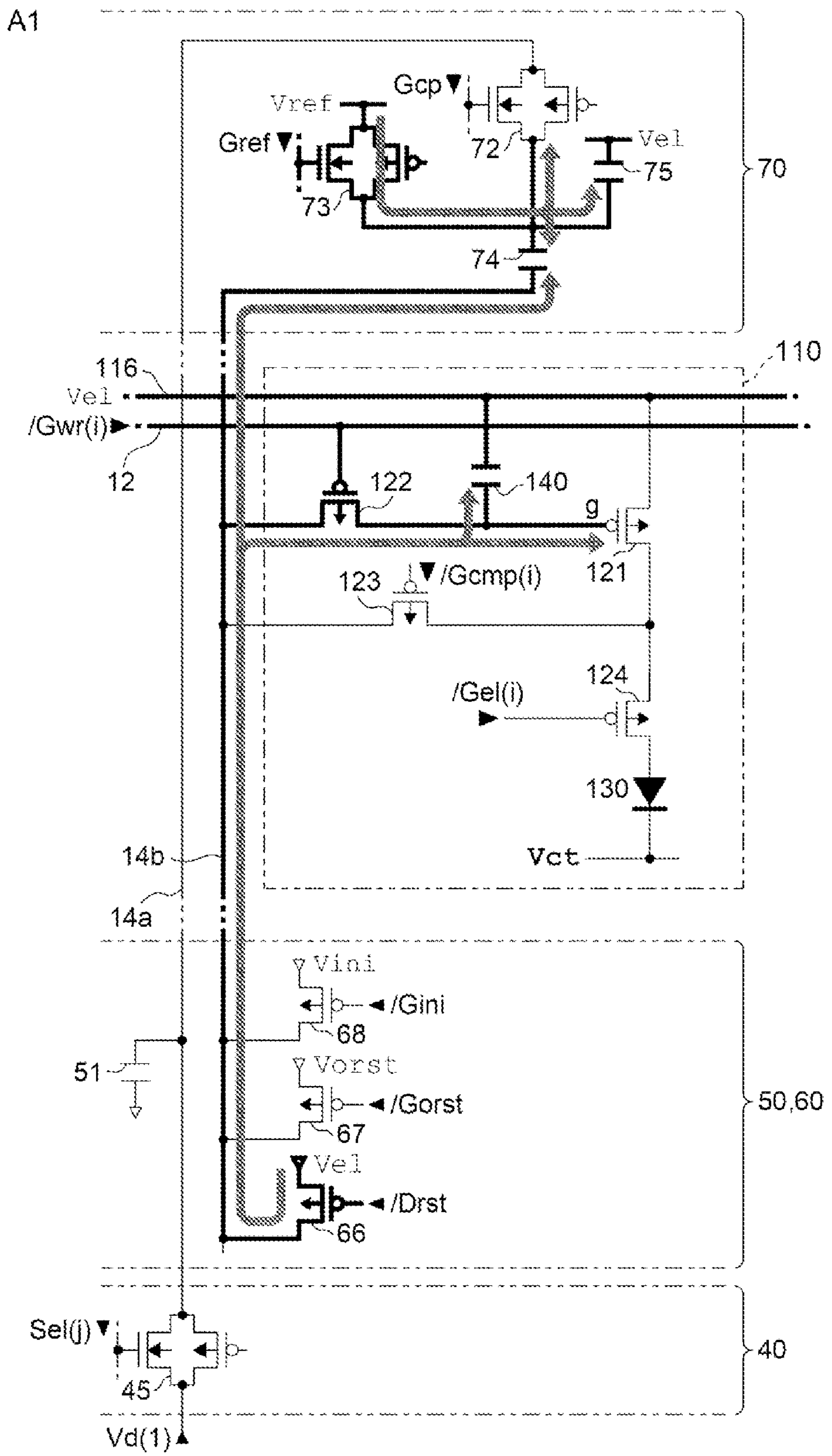
FIG. 6 is a diagram used to explain operation of the electro-optical device.

Thus, in the initialization period (A1), the voltage Vref is applied, through the transmission gate 73, to one end of the capacitance element 74, one end of the capacitance element 75, and the output terminal of the transmission gate 72, as illustrated in FIG. 6. In addition, at the pixel circuit 110, the voltage Vel is applied, sequentially through the transistor 66, the data line 14*b*, and the transistor 122, to one end of the capacitance element 140 and the gate node g of the transistor 121. When the voltage Vel is applied to the gate node g, a voltage between the gate node and the source node becomes zero, which forcibly causes the transistor 121 to be in the OFF state. In addition, as the voltage Vel is applied, through the data line 14*b*, to the other end of the capacitance element 74, the capacitance element 74 is charged with a voltage |Vel−Vref|.

Note that, in FIG. 6, the thick line indicates the application path of the voltage, and does not necessarily indicate a direction in which the current flows. This similarly applies to FIGS. 7 to 11, and FIGS. 21 to 24.

Of each of the horizontal scanning periods (H), in the initialization period (B), the control signal /Gini is at the H level, the control signal /Gorst is at the L level, the control signal /Drst is at the H level, the control signal Gref is at the H level, and the control signal Gcp is at the L level. Thus, the transistor 68 maintains the OFF state. The transistor 67 changes into the ON state. The transistor 66 changes into the OFF state. The transmission gate 73 maintains the ON state. The transmission gate 72 maintains the OFF state.

Furthermore, in the initialization period (B) of the horizontal scanning period (H) in which the i-th row is selected, the scanning signal /Gwr(i) is at the H level, the control signal /Gcmp(i) is at the L level, and the control signal /Gel(i) is at L. Thus, at the pixel circuit 110, the transistor 122 changes into the OFF state, and the transistors 123 and 124 change into the ON state.

Figure 7:
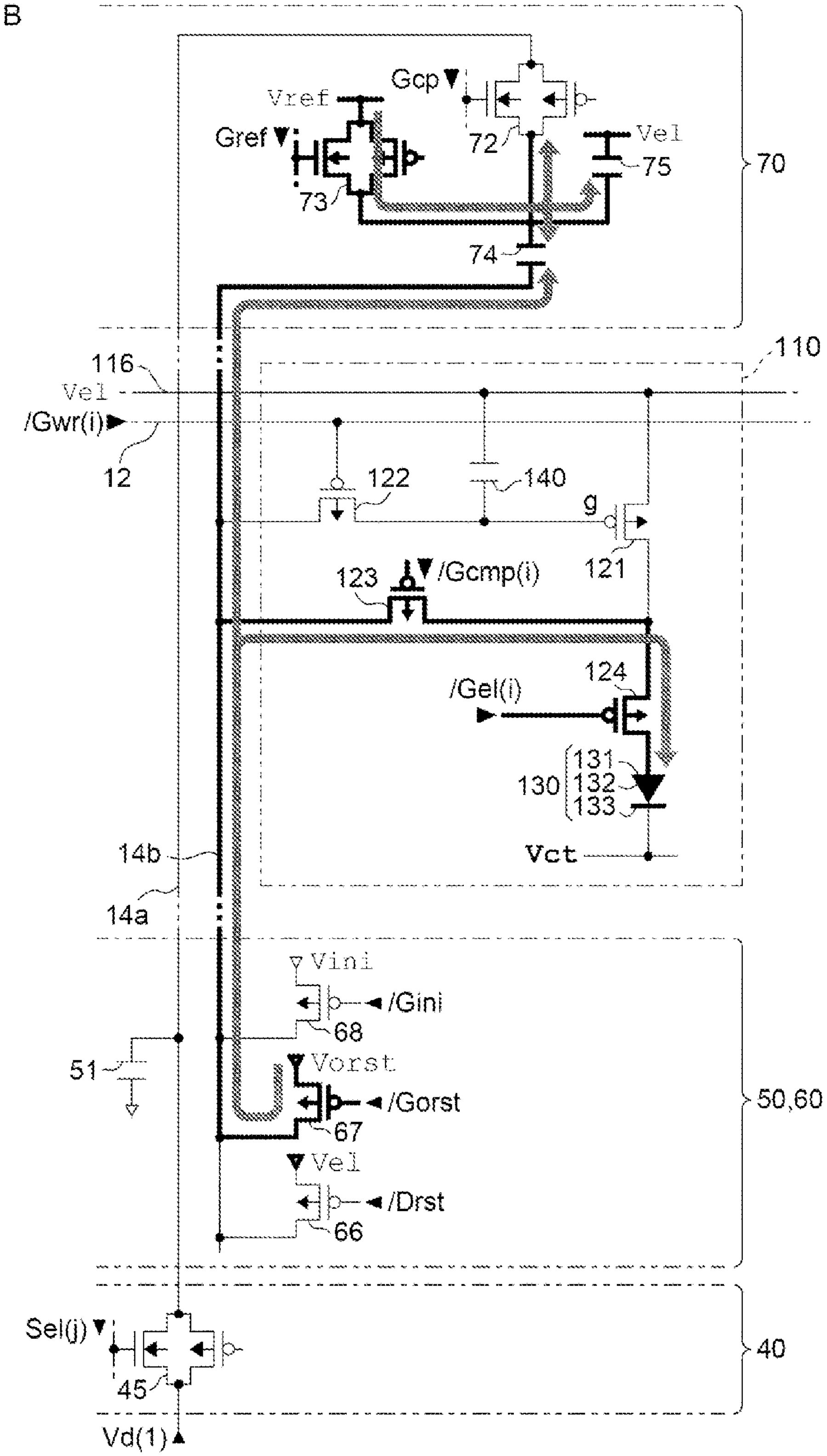
FIG. 7 is a diagram used to explain operation of the electro-optical device.

Thus, in the initialization period (B), one end of the capacitance element 74, one end of the capacitance element 75, and the output terminal of the transmission gate 72 are maintained at the voltage Vref, as illustrated in FIG. 7. In addition, at this pixel circuit 110, the reset voltage Vorst is applied, sequentially through the transistor 67, the data line 14*b*, and the transistors 123 and 124, to the pixel electrode 131 that is an anode of the OLED 130. Since the OLED 130 is configured such that the light emitting layer 132 is interposed between the pixel electrode 131 and the common electrode 133, a capacitor component is parasitized. In the initialization period (B), as the reset voltage Vorst is applied to the pixel electrode 131, the voltage held at the capacitor component, specifically, the voltage corresponding to the current flowing through the OLED 130 in the light emission period (G) is reset. Note that the reset voltage Vorst is a voltage that causes the OLED 130 to be into a not-light-emitting state, and specifically, is zero volt corresponding to the L level or is a voltage (0 to 1 volt) close to the zero volt. Furthermore, as the reset voltage Vorst is applied, through the data line 14*b*, to the other end of the capacitance element 74, the capacitance element 74 is charged to a voltage |Vorst−Vref|.

In the initialization period (C) of each of the horizontal scanning periods (H), the control signal /Gini is at the L level, the control signal /Gorst is at the H level, the control signal /Drst is at the H level, the control signal Gref is at the H level, and the control signal Gcp is at the L level. Thus, the transistor 68 changes into the ON state. The transistor 67 changes into the OFF state. The transistor 66 maintains the OFF state. The transmission gate 73 maintains the ON state. The transmission gate 72 maintains the OFF state.

Furthermore, in the initialization period (C) of the horizontal scanning period (H) in which the i-th row is selected, the scanning signal /Gwr(i) is at the L level, the control signal /Gcmp(i) is at the H level, and the control signal /Gel(i) is at the H level. Thus, at this pixel circuit 110, the transistor 122 changes into the ON state, and the transistors 123 and 124 change into the OFF state.

Figure 8:
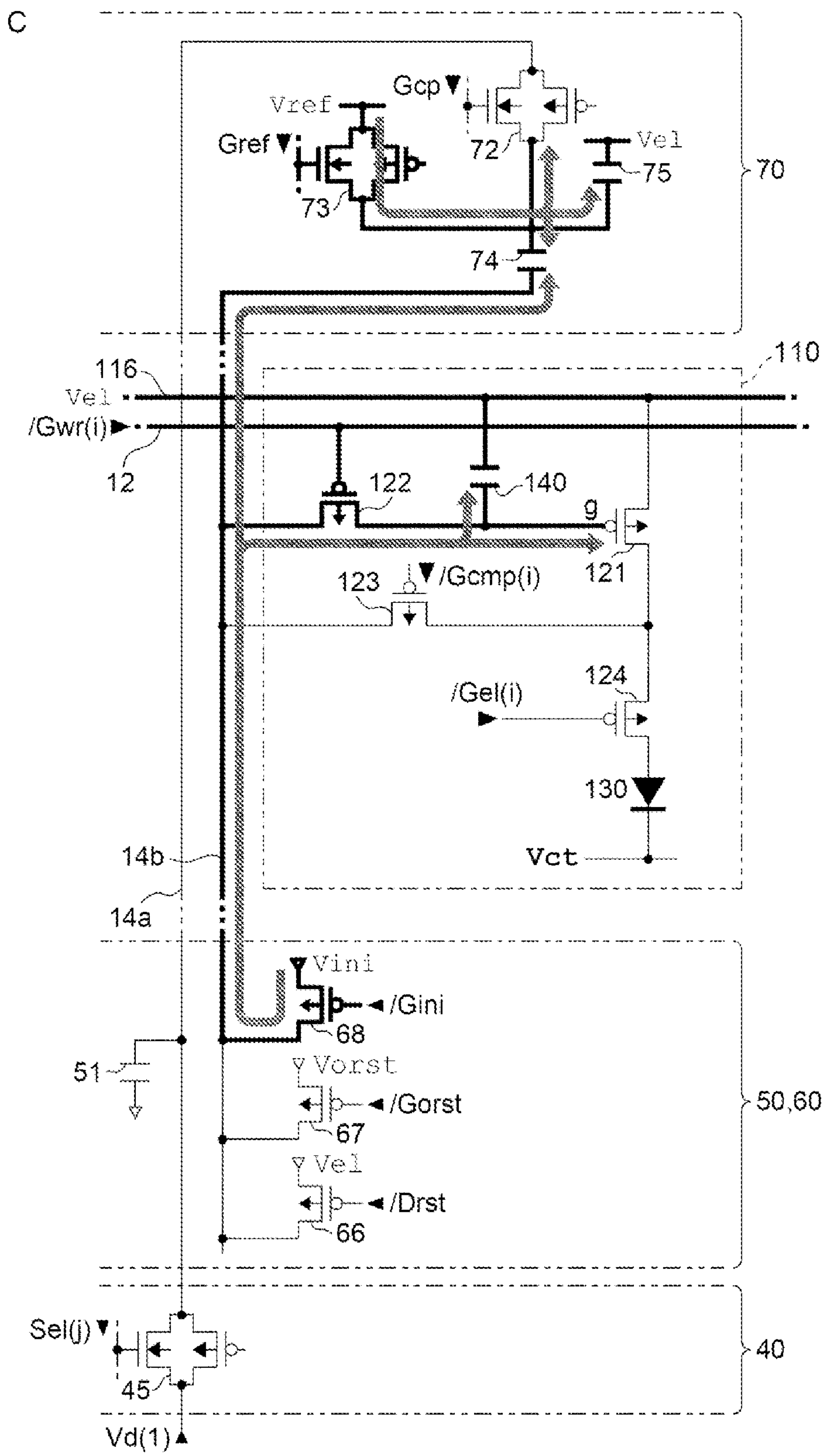
FIG. 8 is a diagram used to explain operation of the electro-optical device.

Thus, in the initialization period (C), one end of the capacitance element 74, one end of the capacitance element 75, and the output terminal of the transmission gate 72 are maintained at the voltage Vref, as illustrated in FIG. 8. In addition, at this pixel circuit 110, the voltage Vini is applied, sequentially through the transistor 68, the data line 14*b*, and the transistor 122, to one end of capacitance element 140 and the gate node g of the transistor 121. The voltage Vini is applied to the other end of the capacitance element 74 through the data line 14*b*, and hence, this capacitance element 74 is charged with the voltage |Vini−Vref|.

In the compensation period (D) of each of the horizontal scanning periods (H), the control signal /Gini is at the H level, the control signal /Gorst is at the H level, the control signal /Drst is at the H level, the control signal Gref is at the H level, and the control signal Gcp is at the L level. Thus, the transistor 68 changes into the OFF state. The transistor 67 maintains the OFF state. The transistor 66 maintains the OFF state. The transmission gate 73 maintains the ON state. The transmission gate 72 maintains the OFF state.

Furthermore, in the compensation period (D) of the horizontal scanning period (H) in which the i-th row is selected, the scanning signal /Gwr(i) is at the L level, the control signal /Gcmp(i) changes into the L level, and the control signal /Gel(i) is at the H level. Thus, at this pixel circuit 110, the transistor 122 maintains the ON state, the transistor 123 changes into the ON state, and the transistor 124 maintains the OFF state.

Figure 9:
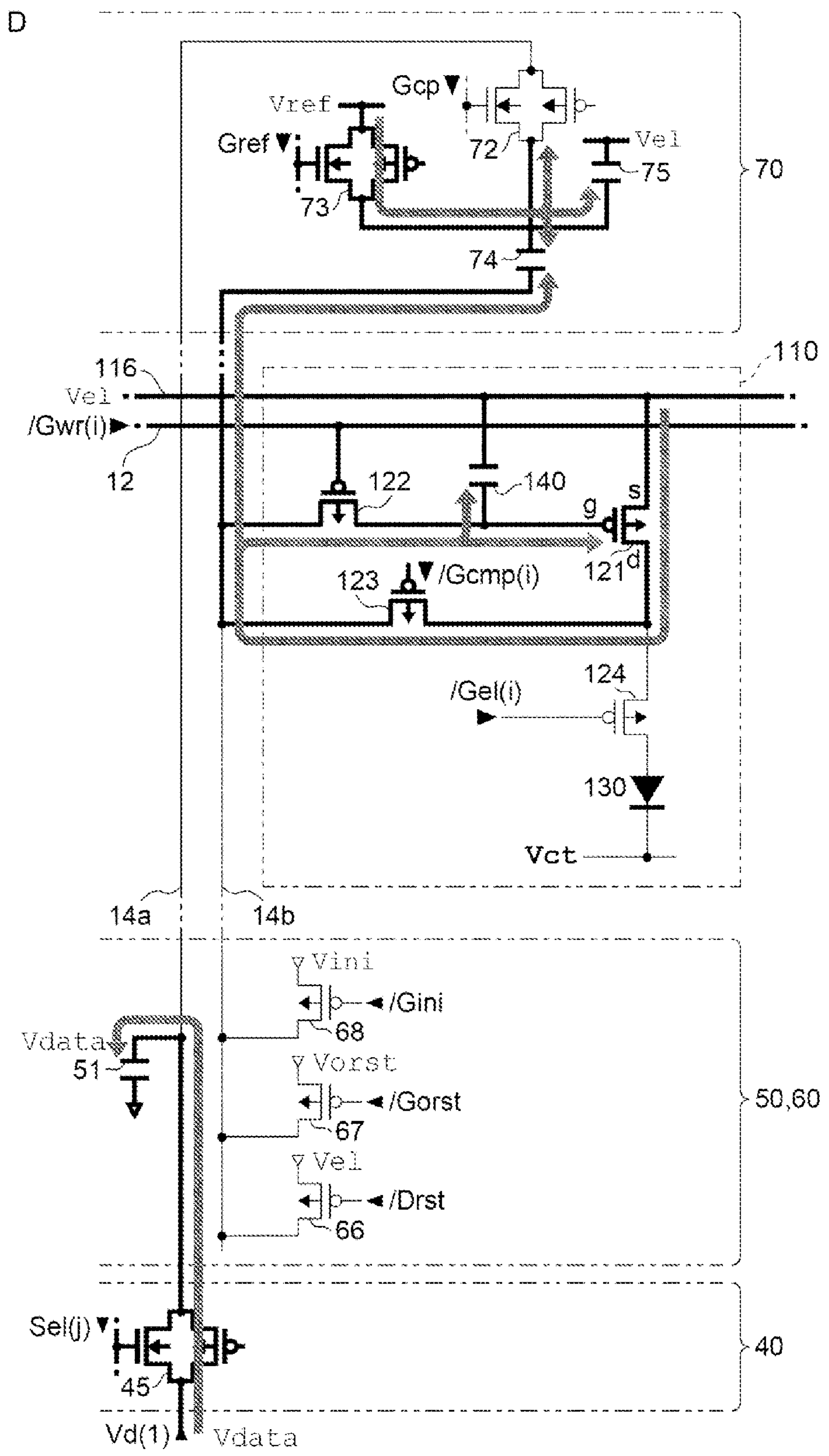
FIG. 9 is a diagram used to explain operation of the electro-optical device.

Thus, in the compensation period (D), one end of the capacitance element 74, one end of the capacitance element 75, and the output terminal of the transmission gate 72 are maintained at the voltage Vref, as illustrated in FIG. 9.

At the pixel circuit 110, the capacitance element 140 is in a state of holding a voltage (Vel−Vini) as a voltage between the gate node and the source node of the transistor 121 in the immediately preceding initialization period (C).

In this state, when the transistors 122 and 123 are into the ON state, the transistor 121 is in the ON state, and the transistor 121 is brought into a state in which the gate node and the drain node are coupled, that is, into a diode coupling state. Thus, at this transistor 121, the voltage Vgs across the gate node and the source node converges so as to approach the threshold voltage of this transistor 121. Here, when the threshold voltage is referred to as "Vth" for the purpose of convenience, the gate node g of the transistor 121 converges so as to approach a voltage (Vel−Vth) corresponding to the threshold voltage Vth.

Note that, at the beginning of the compensation period (D), it is necessary that an electric current flows from the source node toward the drain node at the transistor 121 that is in the diode coupling. Thus, in the initialization period (C) prior to the compensation period (D), the voltage Vini applied to the gate node g has a relationship of Vini<Vel−Vth.

Furthermore, in the compensation period (D), the gate node g of the transistor 121 is coupled to the data line 14*b* through the transistor 122, and the drain node of the transistor 121 is coupled to the data line 14*b* through the transistor 123. Thus, the data line 14*b* and the other end of the capacitance element 74 also converge so as to approach the voltage (Vel−Vth). Thus, the capacitance element 74 is charged at a voltage |Vel−Vth−Vref|.

In the compensation period (D), the control signals Sel(1) to Sel(q) are sequentially and exclusively brought at the H level. Note that, although not illustrated in FIG. 9, in the compensation period (D), the control signals /Sel(1) to /Sel(q) are sequentially and exclusively brought at the L level in synchronization with the control signals Sel(1) to Sel(q). In addition, for example, when the control signal Sel(j) from among the control signals Sel(1) to Sel(q) is in the H level, the data-signal outputting circuit 30 outputs data signals Vd(1) to Vd(3) for three pixels corresponding to intersections of the scanning line 12 in the i-th row and data lines 14*b* that belong to the j-th group. More specifically, in a period in which the control signal Sel(j) is in the H level, the data-signal outputting circuit 30 outputs a data signal Vd(1) corresponding to a pixel at the i-th row and (3j−2)-th column, outputs a data signal Vd(2) corresponding to a pixel at the i-th row and (3j−1)-th column, and outputs a data signal Vd(3) corresponding to a pixel at the i-th row and (3j)-th column.

As a specific example, in a case where the "j" is "2", in a period in which the control signal Sel(2) is at the H level, the data-signal outputting circuit 30 outputs a data signal Vd(1) corresponding to a pixel at the i-th row and fourth column, outputs a data signal Vd(2) corresponding to a pixel at the i-th row and fifth column, and outputs a data signal Vd(3) corresponding to a pixel at the i-th row and sixth column.

As the control signals Sel(1) to Sel(q) are sequentially and exclusively brought at the H level, the capacitance elements 51 corresponding to the first column to the (3q)-th column each hold a voltage of a data signal corresponding to each of the pixels.

Note that FIG. 9 illustrates a state in which the control signal Sel(j) corresponding to the j-th group to which the pixel circuit 110 belongs is at the H level in the compensation period (D), and the capacitance element 51 holds the voltage Vdata of the data signal Vd(1).

In the gate writing period (E) of each of the horizontal scanning periods (H), the control signal /Gini is at the H level, the control signal /Gorst is at the H level, the control signal /Drst is at the H level, the control signal Gref is at the L level, and the control signal Gcp is at the H level. Thus, the transistors 68, 67, and 66 maintain the OFF state. The transmission gate 73 changes into the OFF state. The transmission gate 72 changes into the ON state.

Furthermore, in the gate writing period (E) of the horizontal scanning period (H) in which the i-th row is selected, the scanning signal /Gwr(i) is at the L level, the control signal /Gcmp(i) changes into the H level, and the control signal /Gel(i) is at the H level. Thus, at this pixel circuit 110, the transistor 122 maintains the ON state, the transistor 123 changes into the OFF state, and the transistor 124 maintains the OFF state.

Figure 10:
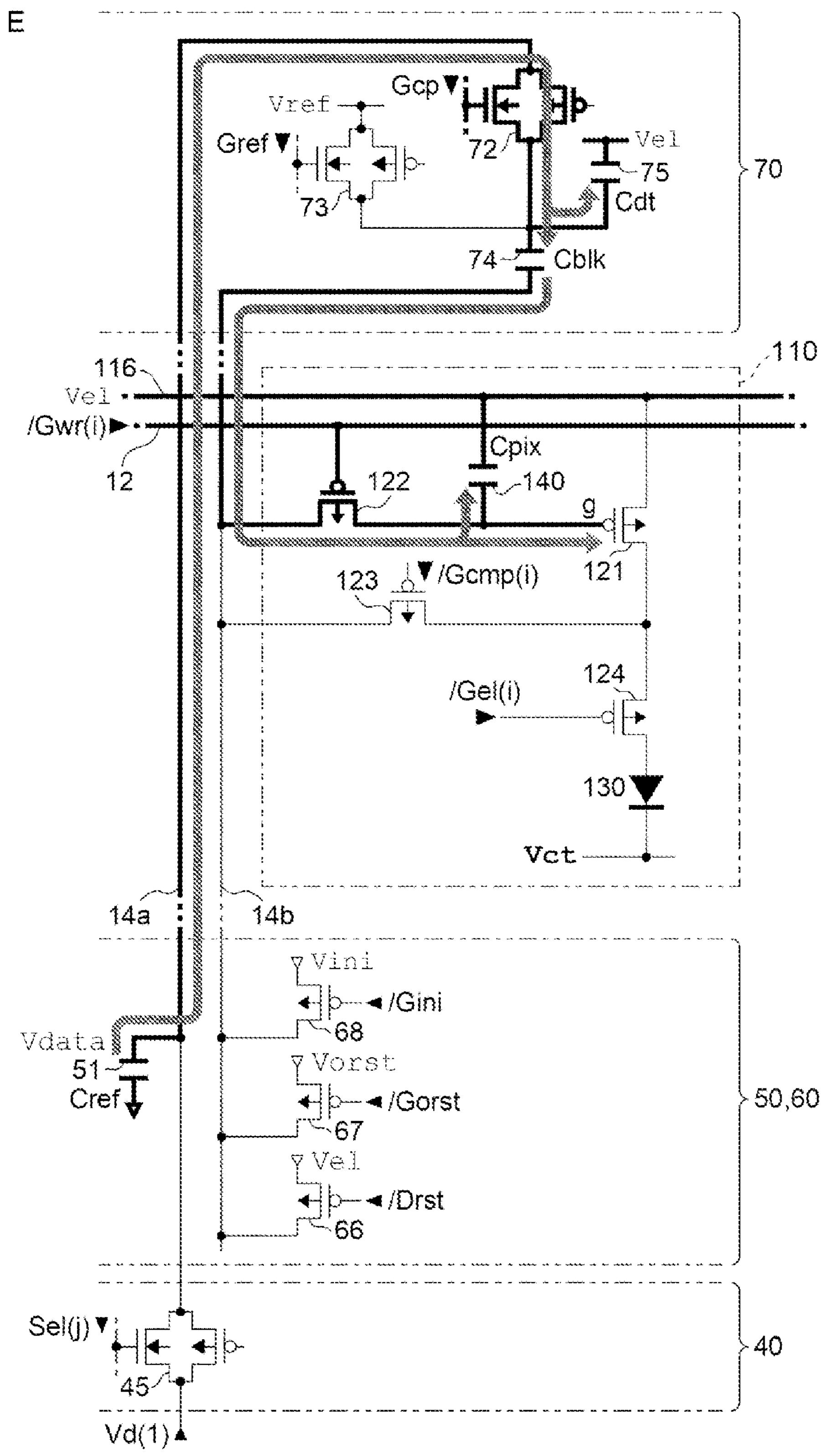
FIG. 10 is a diagram used to explain operation of the electro-optical device.

Thus, in the gate writing period (E) of the horizontal scanning period (H) in which the i-th row is selected, as the transmission gate 73 is in the OFF state and the transmission gate 72 is in the ON state as illustrated in FIG. 10, a voltage of one end of the capacitance element 74 changes from the voltage Vref in accordance with a voltage held at one end of the capacitance element 51. This change in the voltage propagates sequentially through the capacitance element 74, the data line 14*b*, and the transistor 122 to the gate node g. The capacitance element 140 holds a voltage of the gate node g after this change.

Note that, as illustrated in FIG. 10, the capacitor of the capacitance element 51 is denoted with Cref, the capacitor of the capacitance element 74 is denoted with Cblk, the capacitor of the capacitance element 75 is denoted with Cdt, and the capacitor of the capacitance element 140 is denoted with Cpix. In addition, in the compensation period (D), the voltage of the data signal Vd(1) held by one end of the capacitance element 51 is denoted by Vdata.

The amount ΔV of change in voltages at the gate node g from the compensation period (D) to the gate writing period (E) can be expressed by the following Equation 1.

[Mathematical Equation 1]

$$\Delta V = \frac{\frac{Cblk(Cdt+Cpix)}{Cblk+Cdt+Cpix} \times Vref + Cref \times Vdata}{\frac{Cblk(Cdt+Cpix)}{Cblk+Cdt+Cpix} \times (Vdata - Vref)} - Vref = \frac{Cref}{\frac{Cblk(Cdt+Cpix)}{Cblk+Cdt+Cpix}} \times (Vdata - Vref) = Ka \times (Vdata - Vref) \tag{1}$$

That is, as expressed in Equation 1, the gate node g changes into a value obtained by multiplying a coefficient Ka by the amount (Vdata-Vref) of change in voltage at one end of the capacitance element 74. Note that the coefficient Ka is a coefficient less than "1", and is determined by the capacitors Cref, Cblk, Cdt, and Cpix. In other words, design is made such that the capacitors Cref, Cblk, Cdt and Cpix each take an appropriate value, and the coefficient Ka is set to be less than "1". When the coefficient Ka is less than "1", the amplitude of voltage from the minimum value of the voltage Vdata of the data signal to the maximum value is compressed in accordance with the coefficient Ka, and propagates to the gate node g.

When the pixel circuit 110 is miniaturized, the electric current flowing through the OLED 130 may largely change in response to a slight change in the voltage Vgs across the gate node and the source node of the transistor 121.

Even in such a case, in the first embodiment, the voltage amplitude of voltage Vdata of the data signal is compressed in accordance with the coefficient Ka and propagates to the gate node g. This makes it possible to precisely control the electric current flowing through the OLED 130.

After the gate writing period (E), the drain writing period (F) comes. In the drain writing period (F), the control signals /Gini, /Gorst, /Drst, Gref, and Gcp do not change from those in the gate writing period (E). Thus, the transistors 68, 67, and 66 maintain the OFF state. The transmission gate 73 maintains the OFF state. The transmission gate 72 maintains the ON state.

In addition, in the drain writing period (F) of the horizontal scanning period (H) in which the i-th row is selected, the scanning signal /Gwr(i) is at the H level, the control signal /Gcmp(i) is at the L level, and the control signal /Gel(i) is at the H level.

Thus, at the pixel circuit 110, the transistor 122 changes into the OFF state, the transistor 123 changes into the ON state, and the transistor 124 maintains the OFF state.

Figure 11:
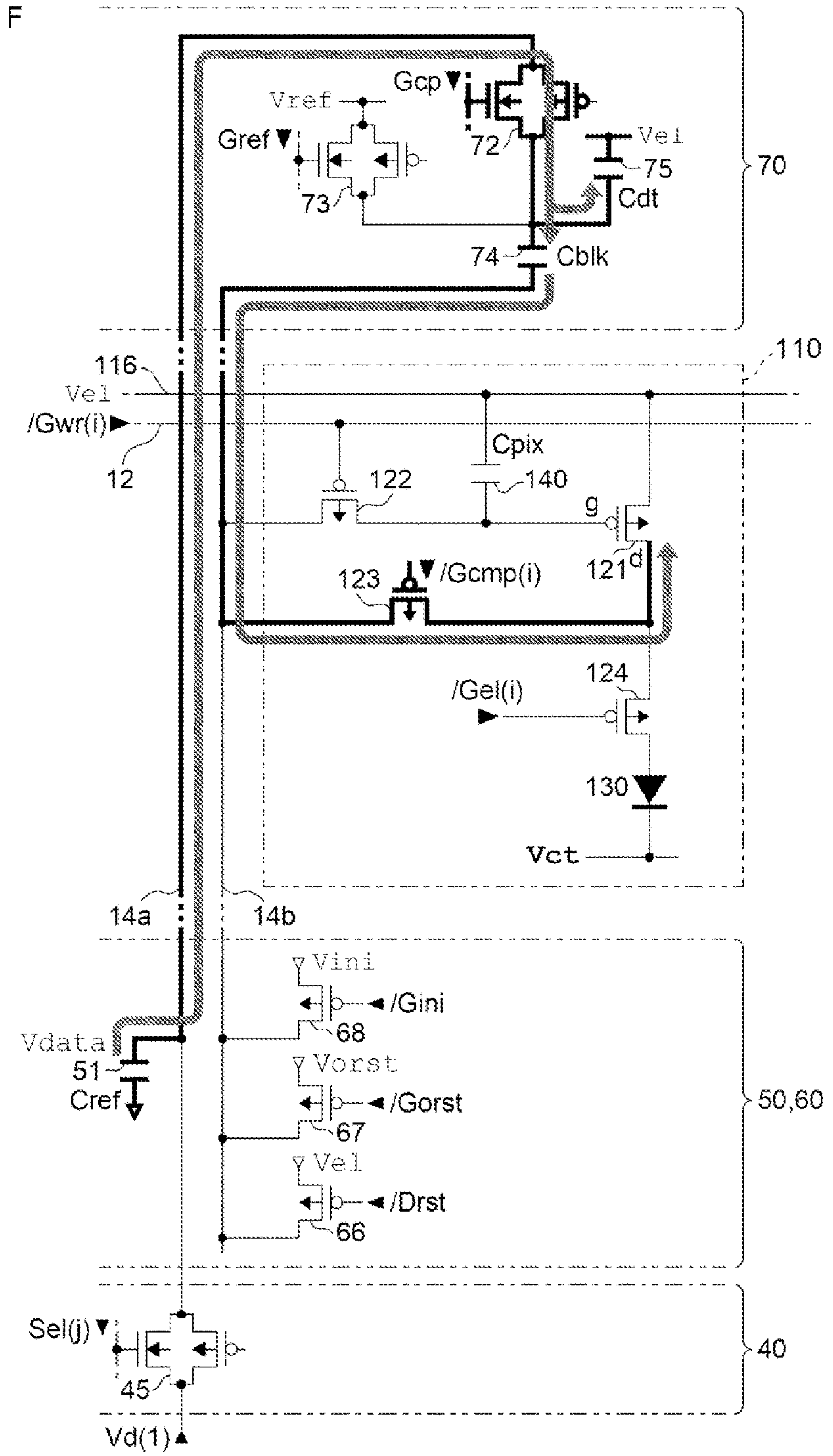
FIG. 11 is a diagram used to explain operation of the electro-optical device.

Thus, in the drain writing period (F) of the horizontal scanning period (H) in which the i-th row is selected, a voltage at the other end of the capacitance element 74, that is, the same voltage as the gate node g of the transistor 121 in the previous gate writing period (E) is applied to the drain node d of the transistor 121 sequentially through the data line 14*b* and the transistor 123 that is at the ON state, as illustrated in FIG. 11. In other words, in the previous gate writing period (E), the same voltage as the voltage supplied to the data line 14*b* is supplied to the drain node d of the transistor 121 through the transistor 123.

Note that the effect obtained by applying the same voltage as the voltage of the gate node g of the transistor 121 to the drain node of the transistor 121 in the drain writing period (F) will be described later.

After the end of the drain writing period (F), the scanning signal /Gwr(i) maintains the H level, and the control signal /Gcmp(i) changes from the L level to the H level. Thus, at the pixel circuit 110, the transistor 122 maintains the OFF state, and the transistor 123 changes into the OFF state.

Figure 12:
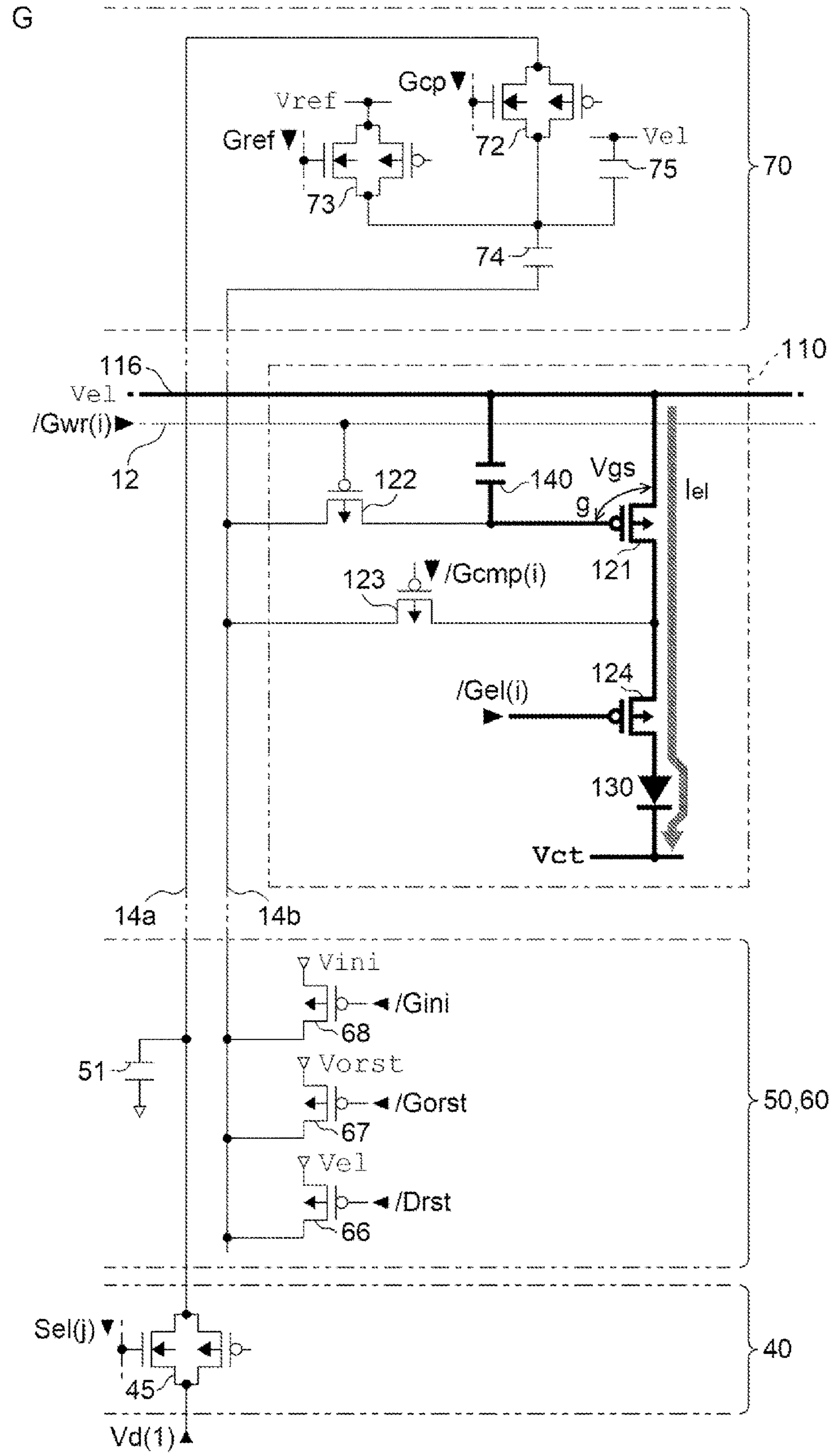
FIG. 12 is a diagram used to explain operation of the electro-optical device.

After this, the period becomes the light emission period (G). Specifically, in the present embodiment, after a horizontal scanning period (H) in which the i-th row is selected, a period of one frame (V) elapses, and the light emission period (G) extends until a horizontal scanning period (H) in which the i-th row is selected again. In the light emission period (G), the control signal /Gel(i) is at the L level. In the light emission period (G) at the i-th row, a current Iel corresponding to the voltage Vgs at the transistor 121 and receiving restriction of resistance between the source and the drain of the transistor 124 is caused to flow through the OLED 130, as illustrated in FIG. 12. Thus, this OLED 130 emits light at the luminance corresponding to this current Iel.

Note that, in FIGS. 6 to 12, there is no specific separation between the region where the capacitance element group 50 is provided and the region where the initialization circuit 60 is provided.

The first embodiment employs a configuration in which the amplitude of the voltage Vdata of the data signal outputted from the data-signal outputting circuit 30 is compressed through the capacitance element 74, and is supplied to the gate node g of the pixel circuit 110 as the data signal.

Meanwhile, the first embodiment employs a configuration in which, in the compensation period (D), the threshold voltage Vth of the transistor 121 is compensated.

Thus, next, an advantage of using the compensation period (D) will be described. Note that, at the time of description of this advantage, it is assumed that the compression ratio of the voltage Vdata of the data signal is "1", that is, the voltage Vdata of the data signal is supplied directly to the data line 14*b* in the gate writing period (E) after the compensation period (D), in order to avoid complicating equations. In addition, it is also assumed that, in the light emission period (G), the resistance between the source node and the drain node of the transistor 124 is ideally zero.

First, in the light emission period (G), the current Iel flowing through the OLED 130 can be expressed by the following Equation 2.

[Mathematical Equation 2]

$$Iel=k_1(Vgs-Vth)^2 \quad (2)$$

Note that the coefficient k1 in Equation 2 can be expressed by the following Equation 3.

[Mathematical Equation 3]

$$k_1=(W/2L)\cdot\mu Cox \quad (3)$$

In Equation 3, W is the channel width of the transistor 121, L is a channel length of the transistor 121, μ is the degree of movement of carrier, and Cox is capacitance, per unit area, of an oxide film (gate) of the transistor 121.

The following Equation 4 expresses the voltage Vgs across the gate node and the source node of the transistor 121 when the voltage Vdata of the data signal is directly applied to the gate node g of the transistor 121 in a configuration in which the voltage Vdata of the data signal is not compressed and the threshold voltage of the transistor 121 is not compensated.

[Mathematical Equation 4]

$$Vgs=|Vel-V\text{data}| \quad (4)$$

At this time, the current Iel flowing through the OLED 130 can be expressed by the following Equation 5.

[Mathematical Equation 5]

$$\begin{aligned} Iel &= k_1(Vgs-Vth)^2 \\ &= k_1(Vel-Vdata-Vth)^2 \end{aligned} \quad (5)$$

As expressed by Equation 5, the current Iel is affected by the threshold voltage Vth. Here, due to the semiconductor processing, variation in the threshold voltage Vth of the transistor 121 falls in a range of several mV to several tens of mV. When variation in the threshold voltage Vth of the transistor 121 falls in a range of several mV to several tens of mV, a difference in current Iel may be a maximum of 40% between adjacent pixel circuits 110.

The property of current-luminance at the OLED 130 is substantially linear. Thus, in a configuration in which the threshold voltage Vth is not compensated, even when the data signal of the same voltage Vdata is supplied to two pixel circuits 110 in order to cause the two OLEDs 130 to emit light with the same luminance, the current flowing through the OLEDs 130 differs in reality. Thus, in the configuration in which the threshold voltage Vth is not compensated, the luminance varies, which results in a significant deterioration in display quality.

The following Equation 6 expresses the voltage Vgs across the gate node and the source node of the transistor 121 when, in the compensation period (D), the gate node g of this transistor 121 is caused to converge so as to approach the voltage (Vel−Vth) and then is changed into the voltage Vdata.

[Mathematical Equation 6]

$$Vgs=Vth-k_2(V\text{data}-V\text{ref}) \quad (6)$$

Note that the coefficient k2 in Equation 6 is a coefficient determined by the capacitors Cblk and Cpix in a configuration in which the voltage Vdata of the data signal is not compressed (configuration in which no capacitance element 74 is provided).

When the voltage Vgs is expressed by Equation 6, the current Iel flowing through the OLED 130 can be expressed by the following Equation 7.

[Mathematical Equation 7]

$$\begin{aligned} Iel &= k_1\{Vth - k_2(Vdata - Vref) - Vth\}^2 \\ &= k_1 k_2 (Vref - Vdata)^2 \end{aligned} \tag{7}$$

In Equation 7, the term of the threshold voltage Vth is removed, and the current Iel is determined by the voltage Vdata of the data signal. This makes it possible to suppress a deterioration in the display quality resulting from the threshold voltage Vth of the transistor 121.

Note that, in the embodiment, in reality, the amplitude of voltage from the minimum value to the maximum value of the voltage Vdata of the data signal is compressed in accordance with the coefficient Ka as expressed in Equation 1, and propagates to the gate node g.

In addition, in the first embodiment, the drain writing period (F) is provided after the compensation period (D) and the gate writing period (E) and before the light emission period (G).

At the end period of the compensation period (D), the drain node d of the transistor 121 converges so as to approach the voltage (Vel−Vth) corresponding to the threshold voltage Vth, and is brought into a state in which this voltage (Vel−Vth) is held by the parasitic capacitor. That is, at the end period of the compensation period (D), electric charge is left at the drain node d of the transistor 121. When the period reaches the light emission period (G) without the drain writing period (F), leak current flows through the OLED 130 due to the electric charge left at the drain node.

Specifically, in the gate writing period (E), even when the gate node g of the transistor 121 holds a data signal corresponding to a gray scale level that is zero, the leak current flows through the OLED 130 due to the remaining electric charge, which results in occurrence of a phenomenon (floating black) in which slight light is emitted.

Thus, as one reference example, a configuration is conceived. In this configuration, the reset voltage Vorst is applied to the drain node d of the transistor 121 in the drain writing period (F) to reset electric charge left from the end period of the compensation period (D).

Figure 15:
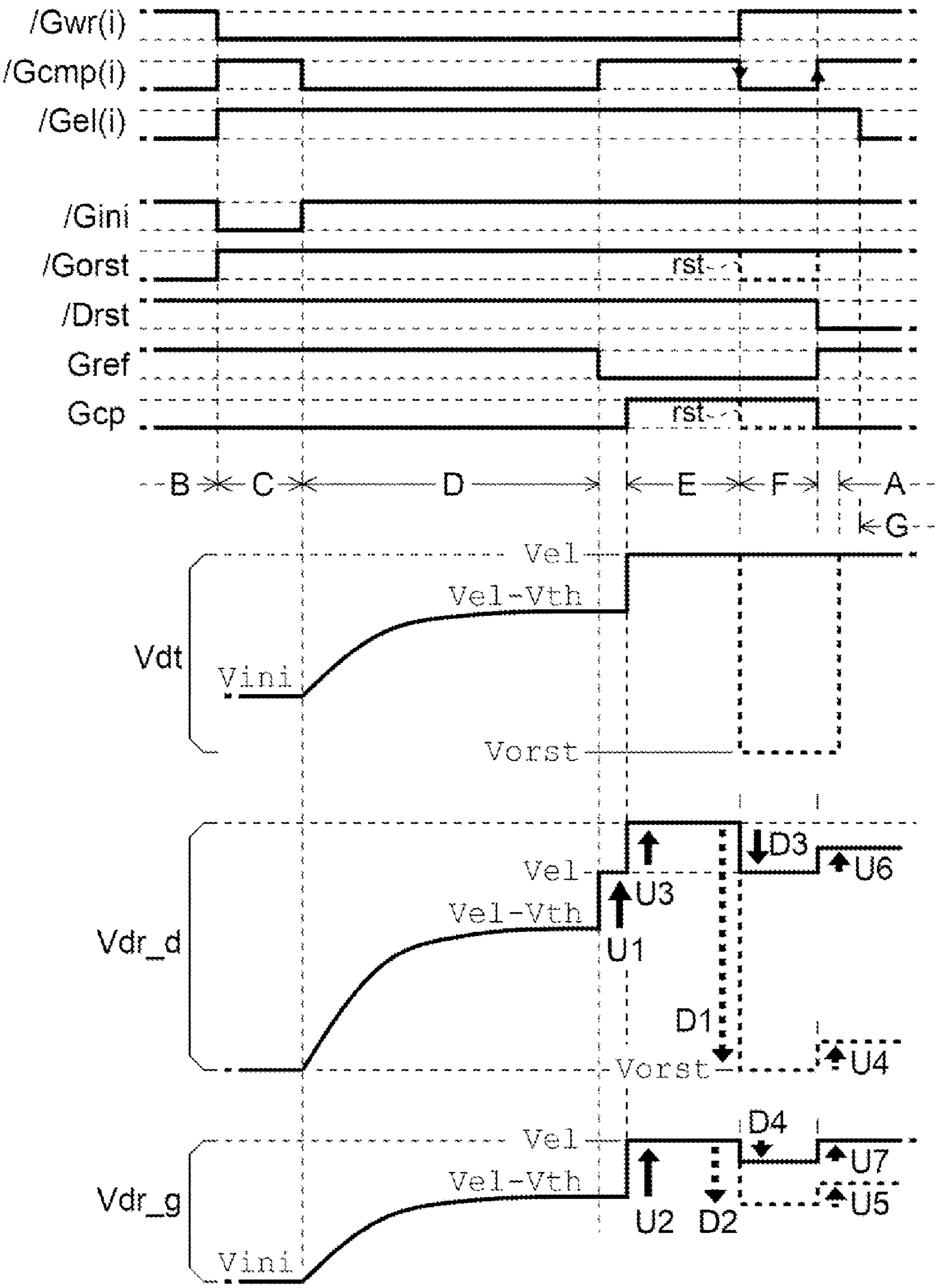
FIG. 15 is a diagram used to explain operation when a gray scale level is zero.
Figure 16:
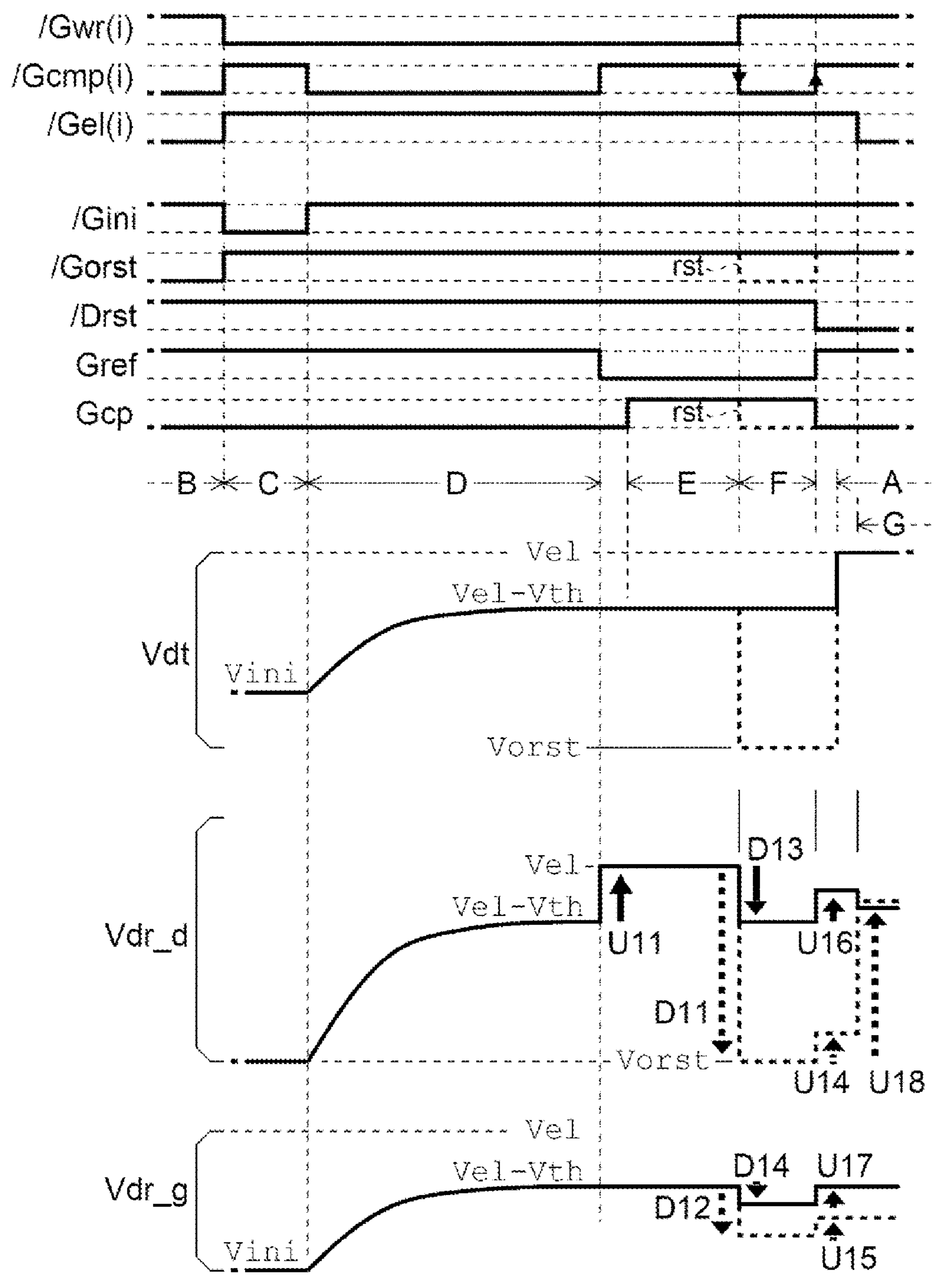
FIG. 16 is a diagram used to explain operation when a gray scale level is a level other than zero.
Figure 29:
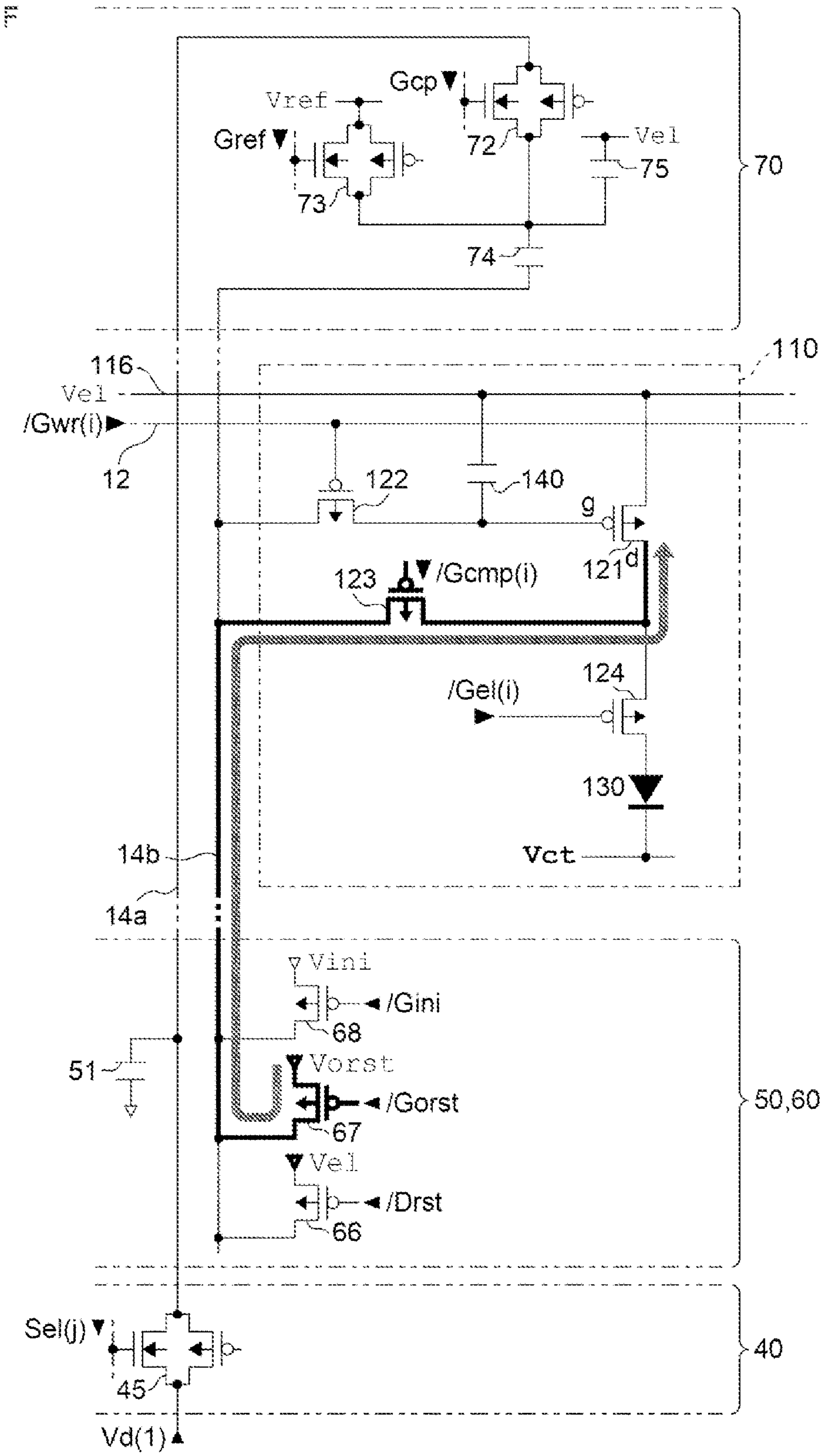
FIG. 29 is a diagram used to explain operation of the electro-optical device according to a reference example.

Specifically, in this reference example, the control signals /Gcmp(i) and Gcp are set to the L level in the drain writing period as illustrated with the dashed line rst in FIGS. 15 and 16. With this configuration, the reset voltage Vorst is applied to the drain node d sequentially through the transistor 67 that is in the ON state, the data line 14*b*, and the transistor 123 that is in the ON state, as illustrated in FIG. 29.

Figure 13:
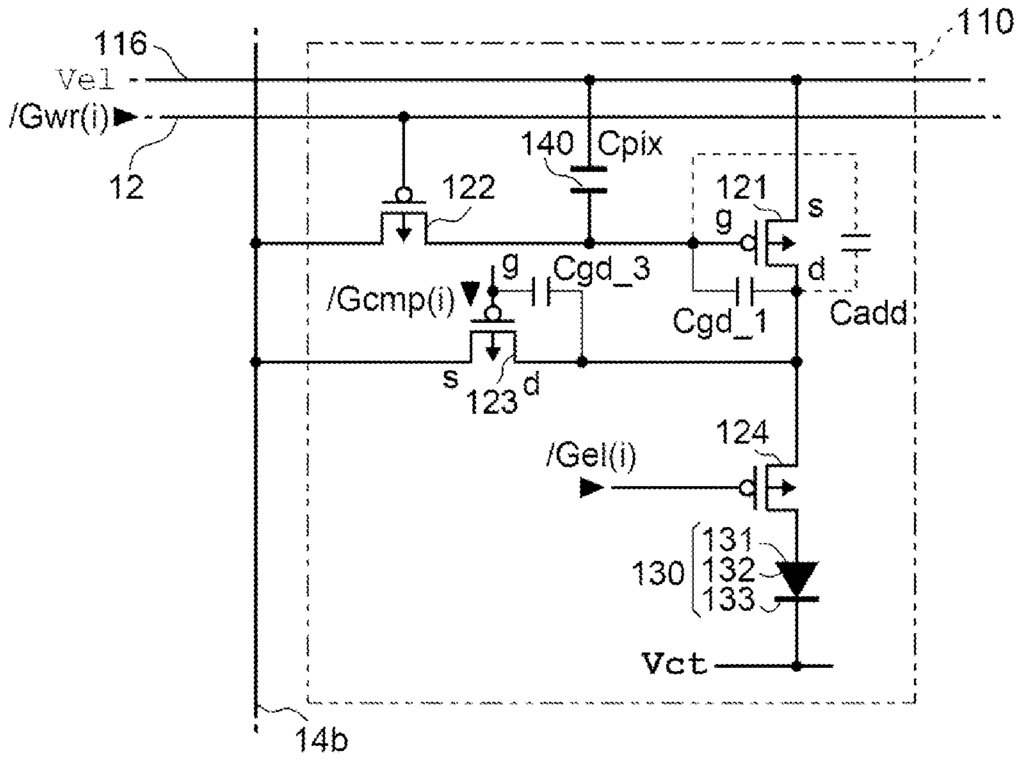
FIG. 13 is a diagram illustrating parasitic capacitors in the pixel circuit.

However, at the actual pixel circuit 110, a capacitor Cgd_1 is parasitized between the gate nod and the drain node of the transistor 121, and a capacitor Cgd_3 is parasitized between the gate node and the drain node of the transistor 123, as illustrated in FIG. 13.

Thus, when the control signal /Gcmp(i) changes from the L level to the H level and the transistor 123 changes from the ON state to the OFF state, a phenomenon called push-up (also called punch through or field through) occurs. In this phenomenon, a voltage at the drain node d of this transistor 123 changes toward a direction in which the control signal /Gcmp(i) changes.

The drain node d of the transistor 123 is coupled to the drain node of the transistor 121. Thus, the change in voltage at the drain node d of the transistor 123 is a change in voltage at the drain node d of the transistor 123.

Here, the amount ΔVdr_d of change in voltages at the drain node d of the transistor 123 (121) due to push-up can be expressed by the following Equation 8.

[Mathematical Equation 8]

$$\Delta Vdr\_d - \Delta Vgcmp \cdot \frac{Cgd\_3}{Cgd\_1 + Cgd\_3 + Cpix} \tag{8}$$

Note that the ΔVgcmp in Equation 8 represents a difference in voltage between the L level and the H level of the control signal /Gcmp(i).

In addition, when a voltage at the drain node d of the transistor 123 (121) changes, this change in voltage propagates through the parasitizing capacitor Cgd_1 to the gate node g of the transistor 121.

The amount ΔVdr_g of change in voltages at the gate node g of the transistor 121 that is influenced by the change in voltage at the drain node d of the transistor 123 (121) can be expressed by the following Equation 9.

[Mathematical Equation 9]

$$\Delta Vdr\_g = \Delta Vdr\_d \cdot \frac{Cgd\_1}{Cgd\_1 + Cpix} \tag{9}$$

Note that, in the present embodiment, since the transistors 121 and 123 are of P-channel type, a change of potential at the gate or drain node when the transistors change from the ON state to the OFF state is the upward direction. When the transistors 121 and 123 are of N-channel type, a change of potential at the gate or the drain node when the transistors change from the ON state to the OFF state is the downward direction, and in some cases, is called push down.

Figure 14:
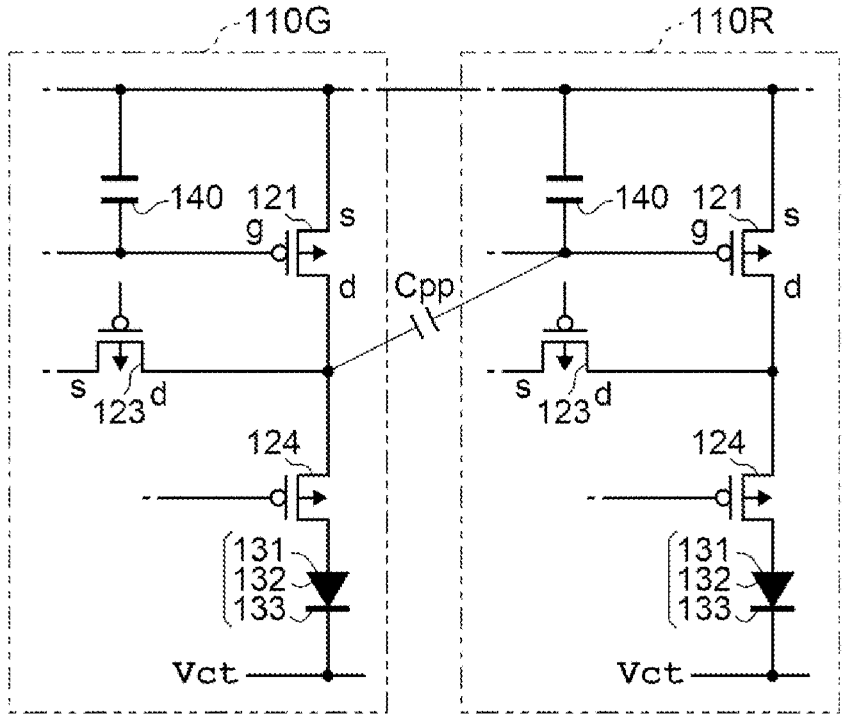
FIG. 14 is a diagram illustrating a parasitic capacitor between adjacent pixel circuits.

FIG. 13 is a diagram illustrated so as to focus on one pixel circuit 110. However, in some cases, a parasitic capacitor may cause an issue between pixel circuits 110 adjacent to each other in the X direction. For example, as illustrated in FIG. 14, a capacitor Cpp is parasitized between the gate node g of the transistor 121 at the pixel circuit 110R and the drain node d of the transistor 121 (123) at the pixel circuit 110G on the left of the pixel circuit 110R.

FIGS. 15 and 16 are diagrams illustrating comparison between the reference example and the present embodiment in terms of changes in voltage of each part of the pixel circuit 110 at the i-th row and a given column. The dashed line indicates the reference example, and the solid line indicates the present embodiment.

Specifically, FIGS. 15 and 16 are diagrams illustrating voltage changes regarding the voltages Vdt and Vdr_d and the voltage Vdr_g in the compensation period (D), the gate writing period (E), the drain writing period (F), and the light emission period (G) of the horizontal scanning period (H) in which the i-th row is selected.

Note that the voltage Vdt is a voltage at the data line 14*b* in a given column, the voltage Vdr_d is a voltage at the drain node d of the transistor 121 (123) of the pixel circuit 110 at the i-th row and a given column, and the voltage Vdr_g is a voltage at the gate node g of the transistor 121 of this pixel circuit 110.

Furthermore, FIG. 15 illustrates a case in which the gray scale level is zero (black display) at the pixel circuit 110. FIG. 16 illustrates a case in which the gray scale level is a level (white display) other than zero at the pixel circuit 110. Note that, in the present embodiment, a gray scale level that causes an electric current to flow through the light emitting element 130 to emit light is one example of white display, and includes the maximum gray-scale to a low gray-scale.

First, description will be made of operation of the pixel circuit 110 when the gray scale level is caused to be zero. In FIG. 15, the voltage Vdt of the data line 14*b* changes from the voltage Vini in the initialization period (C) so as to converge and approach the voltage (Vel−Vth) at the end period of the compensation period (D). At the beginning of the gate writing period (E), the voltage Vdt changes into the voltage Vel corresponding to the black level. The voltage Vdr_d at the drain node d of the transistor 121 converges so as to approach the voltage (Vel−Vth) at the end period of the compensation period (D). In this state, the voltage Vdr_g at the gate node g also converges so as to approach the voltage (Vel−Vth), and the state between the source node and the drain node of this transistor 121 is not the OFF state. Thus, when the transistor 123 is in the OFF state at the end of the compensation period (D), the voltage Vdr_d increases to the voltage Vel as indicated with the U1 in FIG. 15.

At the beginning of the gate writing period (E), the voltage Vdr_g at the gate node g of the transistor 121 changes from the voltage converging so as to approach the voltage (Vel−Vth), into the voltage Vel corresponding to the black level as indicated with U2 in FIG. 15. This change in voltage propagates through the capacitor Cgd_1 to the drain node d of the transistor 121, and causes the voltage Vdr_d to increase as indicated with U3 in FIG. 15.

There is no difference between the reference example and the present embodiment in a period until the gate writing period (E) here.

First, the reference example in the drain writing period (F) and thereafter will be described. At the beginning of the drain writing period (F), the voltage Vdt of the data line 14*b* is the reset voltage Vorst as indicated by the dashed line in FIG. 15. Similarly, the voltage Vdr_d reduces to the reset voltage Vorst as indicated with D1 at the beginning of the drain writing period (F).

The reduction in the voltage Vdr_d to the reset voltage Vorst propagates through the capacitor Cgd_1 to the gate node g of the transistor 121. Thus, the voltage Vdr_g at this gate node g reduces in the drain writing period (F) as indicated with D2.

As the drain writing period (F) ends, the control signal /Gcmp(i) changes from the L level to the H level. Thus, the voltage Vdr_d increases by the amount ΔVdr_d (see Equation 8) of change in voltages due to push-up as indicated with U4 in FIG. 15.

The voltage change of ΔVdr_d of the voltage Vdr_d propagates through the capacitor Cgd_1 to the gate node g of the transistor 121. Thus, the voltage Vdr_g at the gate node g changes as indicated with U5 in FIG. 15. The amount of change in potential of voltage Vdr_g of U5 can be expressed by Equation 9.

Note that, after the end of the drain writing period (F), the voltage Vdt of the data line 14*b* is set to the voltage Vel in the initialization period (A1) of the next horizontal scanning period (H). In addition, the voltage Vdr_d is almost fixed to a value corresponding to the current Iel supplied to the OLED 130 in accordance with the voltage Vdr_g at the gate node g of the transistor 121 in the light emission period (G).

In contrast to the reference example, in the present embodiment, in the drain writing period (F), the same voltage as that in a data writing period (E) is applied to the drain node d of the transistor 121 through the data line 14*b*.

Thus, in the present embodiment, in the drain writing period (F), both the voltage Vdt of the data line 14*b* and the voltage Vdr_d at the drain node d are the voltage Vel corresponding to the black level. In the present embodiment, in the drain writing period (F), the voltage Vdr_d at the drain node d is higher than that in the reference example, and hence, works in a direction in which the leak current to the OLED 130 increases (in a direction in which the contrast decreases).

In the present embodiment, a change in the voltage Vdr_d from the gate writing period (E) to the drain writing period (F) is smaller than that in the reference example. Thus, as for the voltage change of ΔVdr_d, the D4 of the change in voltage at the time of propagating to the gate node g through the capacitor Cgd_1 is smaller than the D2 in the reference example.

For this reason, in the present embodiment, after the end of the drain writing period (F), a voltage of the voltage Vdr_g at the gate node g is higher than that in the reference example, and hence, works to reduce the leak current to the OLED 130.

Thus, in the present embodiment, the increase in the leak current to the OLED 130 due to the increase in the voltage Vdr_d at the drain node d is canceled by the decrease in the leak current to the OLED 130 due to the increase in the voltage of the voltage Vdr_g at the gate node g.

For this reason, with the present embodiment, it is possible to prevent the floating black due to the leak current to the OLED 130.

Next, description will be made of one example of operation of the pixel circuit 110 when the gray scale level is set to a level other than zero.

In FIG. 16, the voltage Vdt of the data line 14*b* converges from the voltage Vini in the initialization period (C) so as to approach the voltage (Vel−Vth) at the end period of the compensation period (D). At the beginning of the gate writing period (E), the voltage Vdt becomes a voltage close to the voltage (Vel−Vth) corresponding to a white level, and hence, does not change from the compensation period (D).

The voltage Vdr_d at the drain node d of the transistor 121 converges so as to approach the voltage (Vel−Vth) at the end of the compensation period (D). In this state, the voltage Vdr_g at the gate node g also converges so as to approach the voltage (Vel−Vth), and the state between the source node and the drain node of this transistor 121 is not the OFF state. Thus, as the transistor 123 brought into the OFF state due to the end of the compensation period (D), the voltage Vdr_d increases to the voltage Vel as indicated with U11 in FIG. 16.

At the time of achieving the gray scale level as illustrated in FIG. 16, the voltage Vdt of the data line 14*b* does not change at the beginning of the gate writing period (E). Thus, the voltage Vdr_g at the gate node g of the transistor 121 also does not change from a voltage close to (Vel−Vth).

There is no difference between the reference example and the present embodiment in a period until the gate writing period (E) here.

First, the reference example in the drain writing period (F) and thereafter will be described. In the drain writing period (F), the voltage Vdt of the data line 14*b* is the reset voltage Vorst as indicated by the dashed line in FIG. 16. Similarly, the voltage Vdr_d reduces to the reset voltage Vorst as indicated with D11 in the drain writing period (F).

The reduction in the voltage Vdr_d to the reset voltage Vorst propagates through the capacitor Cgd_1 to the gate node g of the transistor 121. Thus, the voltage Vdr_g at this gate node g reduces as indicated with D12 in the drain writing period (F).

After the end of the drain writing period (F), the control signal /Gcmp(i) changes from the L level to the H level. Thus, the voltage Vdr_d changes due to push-up as indicated with U14 in FIG. 16.

The voltage change in the voltage Vdr_d propagates through the capacitor Cgd_1 to the gate node g of the transistor 121. Thus, the voltage Vdr_g at this gate node g changes as indicated with U15 in FIG. 16.

After this, when the period reaches the light emission period (G), the voltage Vdr_d at the drain node d is almost fixed to a value corresponding to the current Iel supplied to the OLED 130 in accordance with the voltage Vdr_g at the gate node g of the transistor 121.

In contrast to the reference example, in the present embodiment, in the drain writing period (F), a voltage close to the voltage (Vel−Vth) corresponding to the same white level as that in the data writing period (E) is applied to the drain node d of the transistor 121 through the data line 14*b*. Thus, the voltage Vdr_d changes as indicated with D13 in FIG. 16. The change in the voltage Vdr_d propagates to the gate node g through the capacitor Cgd_1, and hence, the voltage Vdr_g changes as indicated with D14 in FIG. 16.

After the end of the drain writing period (F), the control signal /Gcmp(i) changes from the L level to the H level, and hence, the voltage Vdr_d changes due to push-up as indicated with U16 in FIG. 16. The change in the voltage Vdr_d propagates to the gate node g through the capacitor Cgd_1, and hence, the voltage Vdr_g changes as indicated with U17 in FIG. 16.

After this, when the period reaches the light emission period (G), the voltage Vdr_d at the drain node d is almost fixed to a value corresponding to the current Iel supplied to the OLED 130 in accordance with the voltage Vdr_g at the gate node g of the transistor 121.

It should be noted that the reference example is configured such that, after the voltage Vdr_d is set to the reset voltage Vorst in the drain writing period (F), the voltage Vdr_d increases as indicated with U14 as a result of a change of the control signal /Gcmp(i) from the L level to the H level, and further increases as indicated with U18 as a result of supply of the current Iel in the light emission period (G).

In particular, the increase in the voltage Vdr_d of the U18 propagates through the capacitor Cpp (see FIG. 14) to the gate node g of the transistor 121 of adjacent pixel circuit 110, and causes a voltage at the gate node g to increase. This increase in the voltage at the gate node g works in a direction in which the current Iel reduces in the light emission period (G), and hence, reduces the luminance of light emitted by the OLED 130 of the adjacent pixel circuit 110, which results in a cause of display irregularity.

Note that, in the timing charts disclosed, for example, in FIGS. 15 and 16, values of the voltage Vdt, the voltage Vdr_d, and the voltage Vdr_g contain shifts due to voltage drops. For example, at the end period of the compensation period (D), a value of the voltage Vdr_g is desirable to be the voltage (Vel−Vth). However, in reality, the value of the voltage Vdr_g may be a value at or around the voltage (Vel−Vth). The present embodiment includes the details described above. In addition, for example, in FIG. 16, a value of the voltage Vdr_g in the gate writing period (E) is set to the voltage (Vel−Vth) as one example of a case in which the value does not change from a voltage at the end period of the compensation period (D). However, when a voltage at the end period of the compensation period (D) is the voltage (Vel−Vth) or vicinity thereof, a voltage of the voltage Vdr_g in the gate writing period (E) is the voltage (Vel−Vth) of vicinity thereof. The present embodiment includes the details described above.

In contrast, in the present embodiment, a change in the voltage Vdr_d is smaller than that in the reference example. Thus, this voltage change is less likely to propagate to the gate node g of the transistor 121 of the adjacent pixel circuit 110.

Note that the current Iel is almost zero when the gray scale level is made zero, and hence, the voltage Vdr_d does not almost change even when the period moves to the light emission period (G). Thus, the display irregularity due to the voltage change propagating through the capacitor Cpp does not occur. In other words, the display irregularity due to the voltage change propagating through the capacitor Cpp occurs when the current Iel in the light emission period (G) is large, that is, when the gray scale level is approximately at the middle level or higher.

In this manner, with the present embodiment, it is possible to suppress occurrence of the display irregularity due to the voltage change propagating through the capacitor Cpp when the gray scale level is approximately at a middle level or higher.

Figure 17:
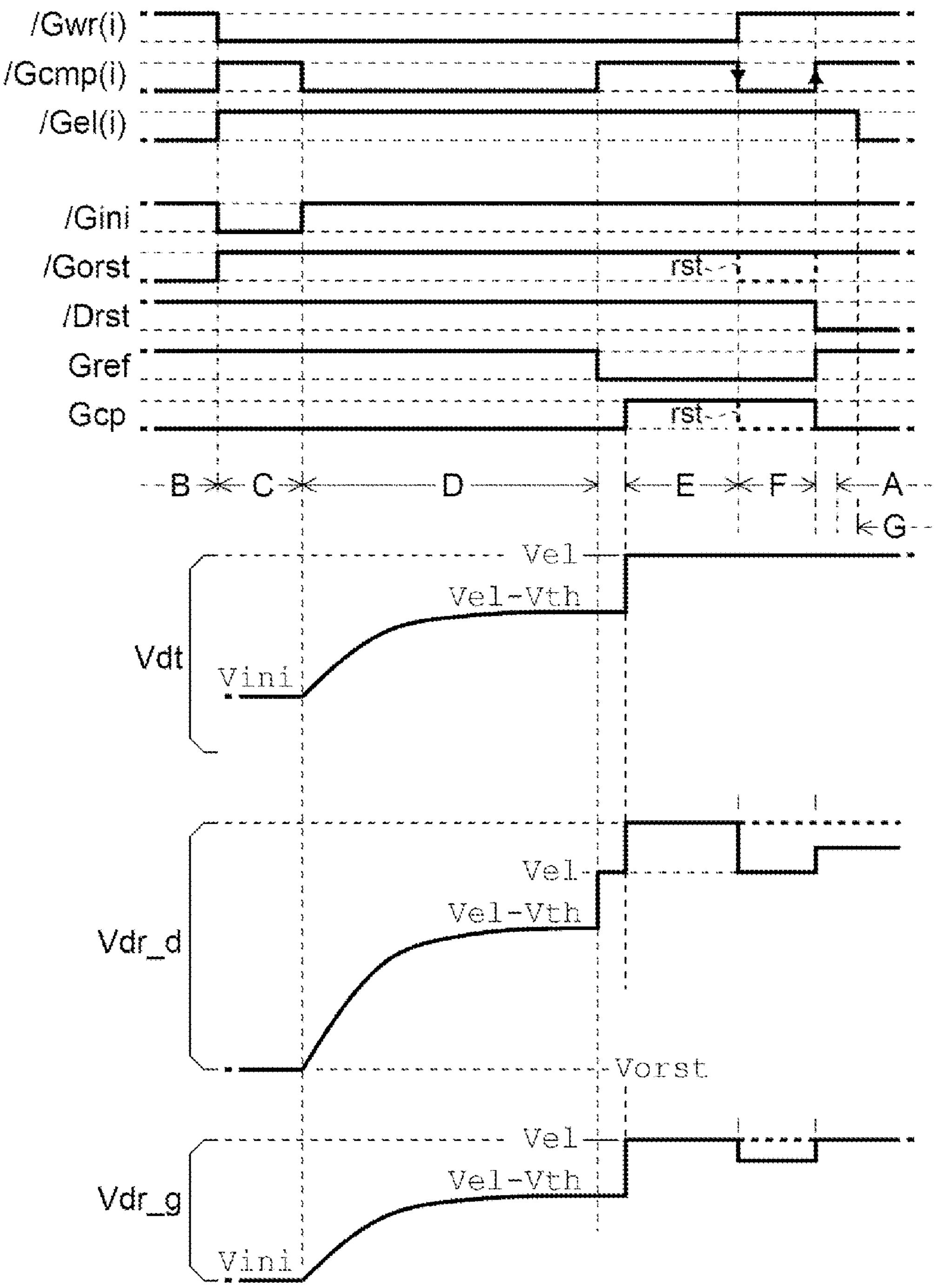
FIG. 17 is a diagram used to explain operation when a gray scale level is zero.

FIG. 17 is a diagram illustrating comparison of voltage changes at individual portions in the pixel circuit 110 in a configuration according to another reference example in which no voltage is applied to the drain node d of the transistor 121 in the drain writing period (F). In the drawing, the dashed line indicates the other reference example and the solid line indicates the present embodiment. In addition, FIG. 17 illustrates a case in which the gray scale level is zero (black display) at the pixel circuit 110.

In the present embodiment, as illustrated in FIG. 17, when the gray scale level is caused to be zero in the drain writing period (F), the voltage Vdr_d at the drain node d is lower than that of the configuration according to the other reference example in which no voltage is applied to the drain node d of the transistor 121. Thus, the present embodiment works in a direction in which the leak current to the OLED 130 decreases, as compared with the other reference example.

On the other hand, the voltage Vdr_g at the gate node g in the present embodiment is almost the same as that in the other reference example. Thus, with the present embodiment, it is possible to increase the contrast ratio while suppressing occurrence of floating black, as compared with the other reference example.

In the electro-optical device 10, the pixel circuit 110 is driven by the control circuit 20, the data-signal outputting circuit 30, the switch group 40, the capacitance element group 50, the initialization circuit 60, the auxiliary circuit 70, and the scanning line drive circuit 120. Thus, it is possible to concept them as driving circuits of the pixel circuit 110 thereof.

Second Embodiment

Next, an electro-optical device 10 according to the second embodiment will be described. The second embodiment differs from the first embodiment in the following points. Specifically, the second embodiment differs from the first embodiment in the configuration of the pixel circuit 110, the configuration of the display region 100, and waveforms of the scanning signal and the control signal.

Thus, the second embodiment will be described with focus being mainly placed on points differing from the first embodiment. In addition, the same reference characters are attached to the same elements as those in the first embodiment, and explanation thereof will not be repeated as appropriate.

Figure 18:
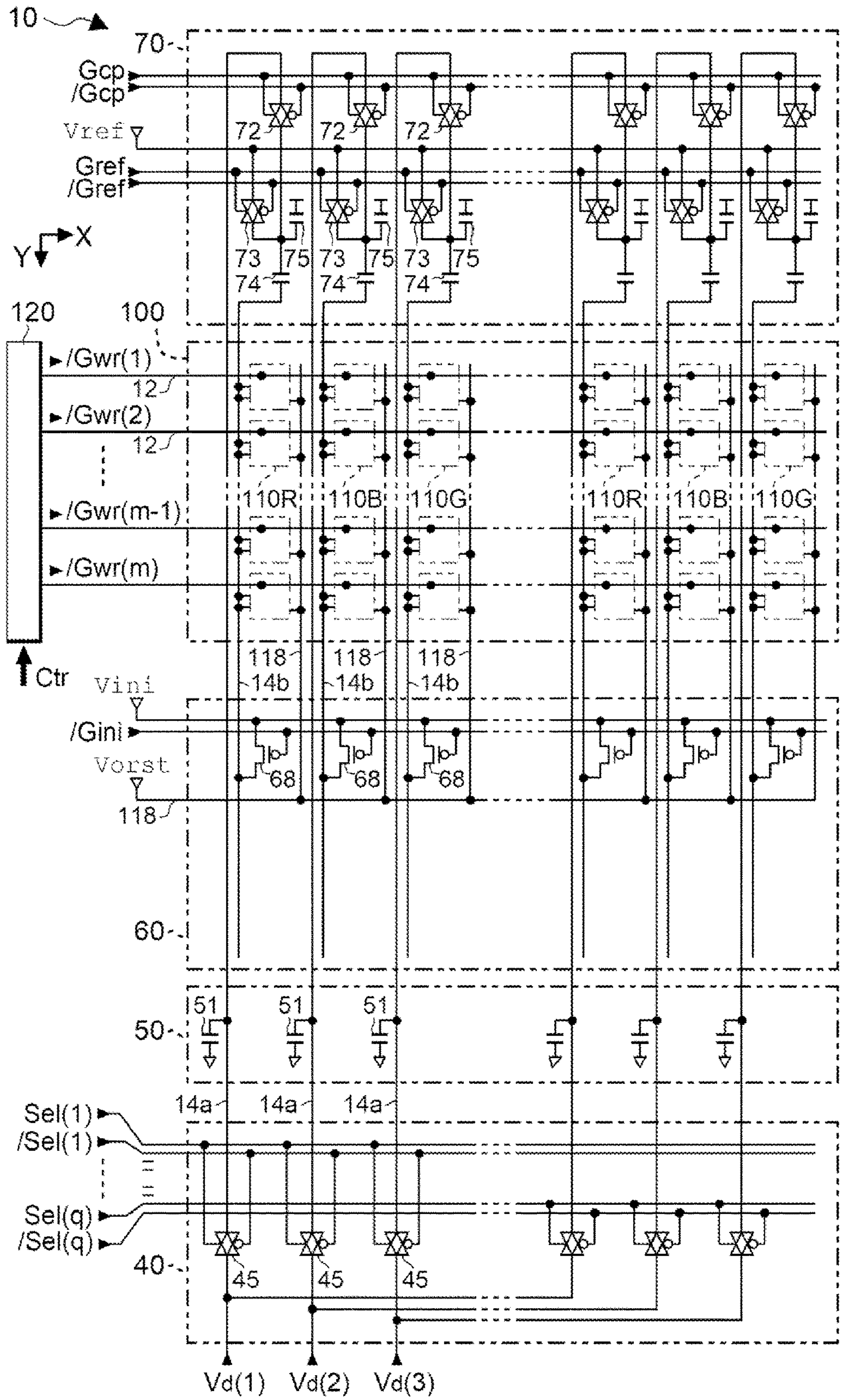
FIG. 18 is a block diagram illustrating an electrical configuration of an electro-optical device according to the second embodiment.
Figure 19:
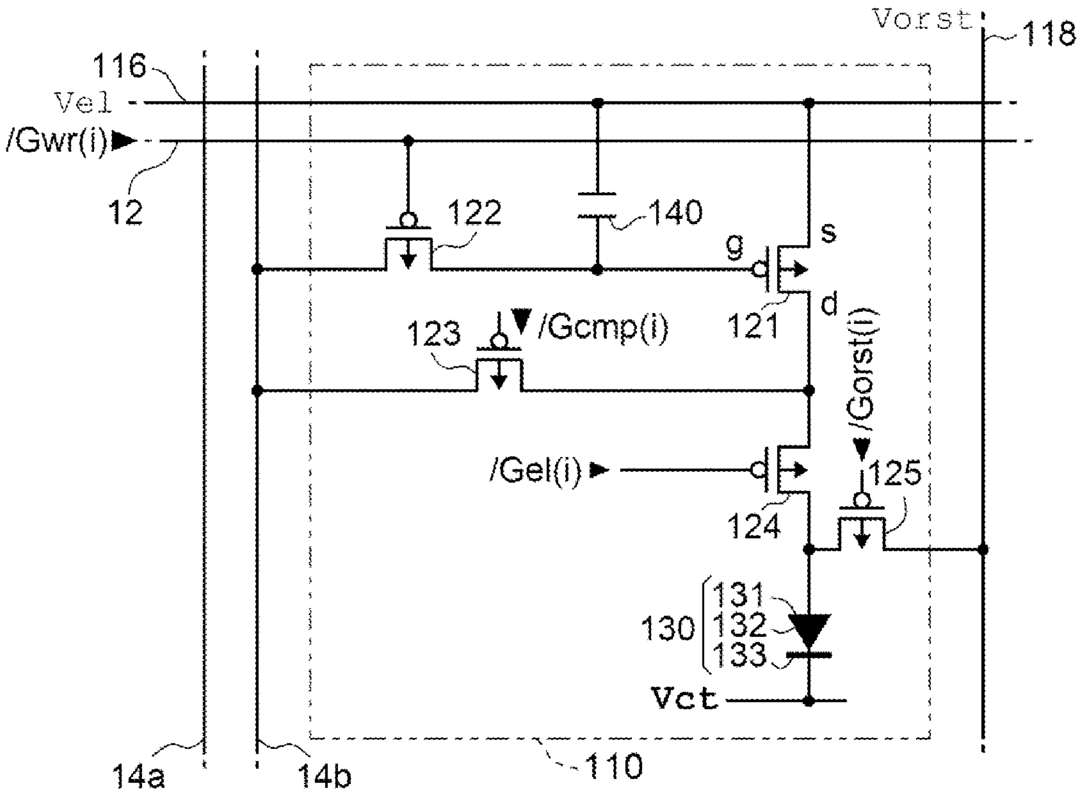
FIG. 19 is a diagram illustrating a pixel circuit in the electro-optical device.

FIG. 18 is a circuit diagram illustrating a portion of the electro-optical device 10 according to the second embodiment. FIG. 19 is a diagram illustrating the configuration of the pixel circuit 110 according to the second embodiment.

The circuit illustrated in FIG. 18 differs from that in the first embodiment illustrated in FIG. 3 in that no transistor 66, 67 is provided for each of the data lines **14*b* in the initialization circuit 60, and the power supplying line 118 extends to the display region 100 to supply each of the pixel circuits 110** with the reset voltage Vorst.

As no transistor 66, 67 is provided in the second embodiment, supply of the control signals /Drst and /Gorst by the control circuit 20 is skipped. Note that the skipped control signal /Gorst is common to the individual rows. However, instead, in the second embodiment, control signals /Gorst(1) to /Gorst(m) corresponding to the first to m-th rows are supplied by the scanning line drive circuit 120.

The configuration of the pixel circuit 110 according to the second embodiment will be described with reference to FIG. 19. The circuit illustrated in FIG. 19 differs from the circuit illustrated in FIG. 4 in that a transistor 125 is provided. Specifically, the transistor 125 is of P-channel MOS type, as with the transistors 121 to 124.

At a pixel circuit 110 disposed at the i-th row and a given one column, the source node of the transistor 125 is coupled to the pixel electrode 131 and the drain node of the transistor 124, and the drain node of the transistor 125 is coupled to the power supplying line 118 extending to the display region 100. The gate node of this transistor is supplied with a control signal /Gorst(i) corresponding to the i-th row.

Figure 20:
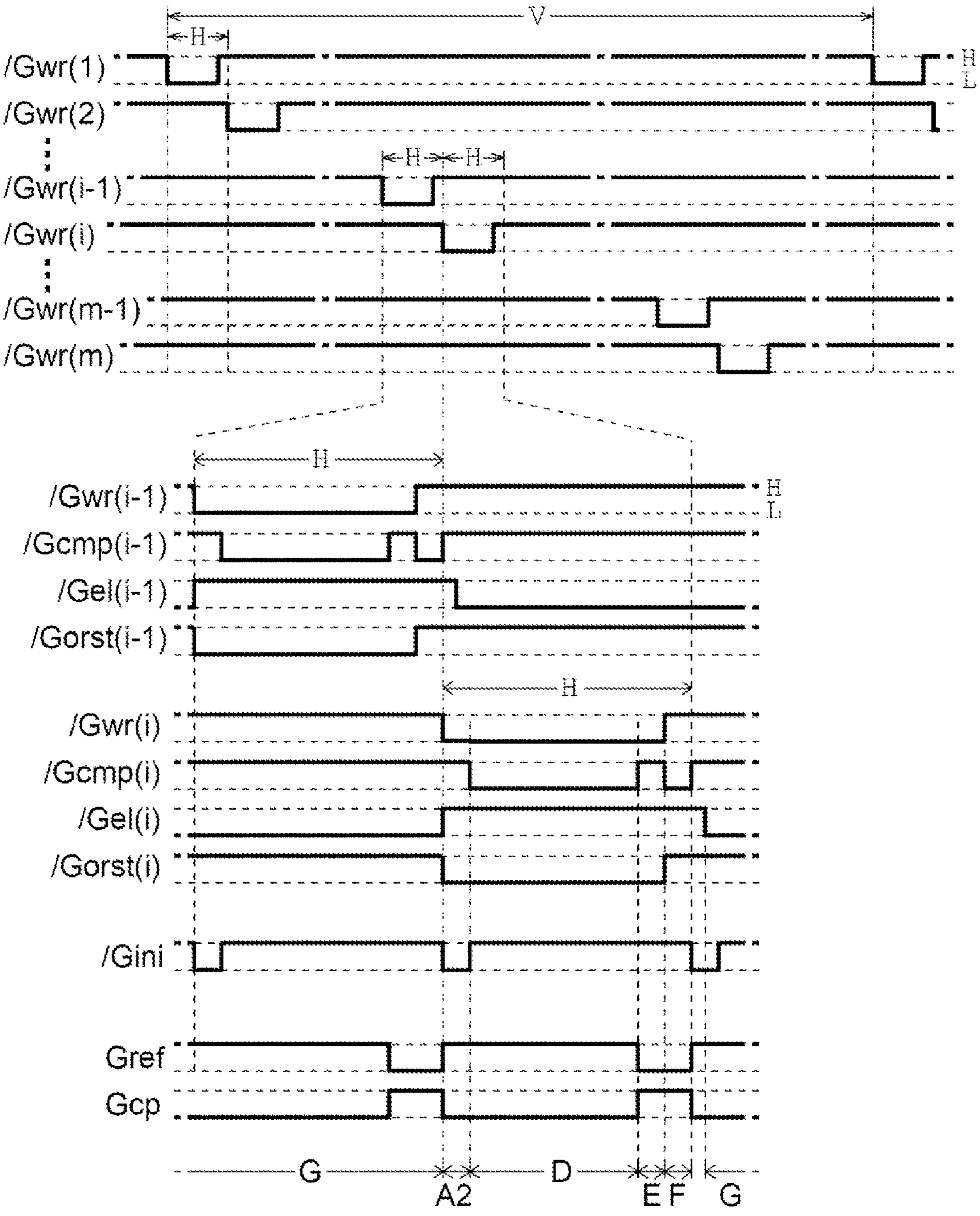
FIG. 20 is a timing chart illustrating operation of the electro-optical device.

FIG. 20 is a timing chart used to explain operation of the electro-optical device 10 according to the second embodiment.

In this electro-optical device 10, the horizontal scanning period (H) is divided into four periods in the order of time: the initialization period (A2), the compensation period (D), the gate writing period (E), and the drain writing period (F). That is, in the second embodiment, the initialization period (B) or (C) that is provided in the first embodiment is not provided. In addition, from the viewpoint of operation of the pixel circuit 110, the light emission period (G) is added to the four periods described above.

In the initialization period (A2), processes are performed in parallel. One process is a process for resetting a potential at the anode of the OLED 130, and the other process is a process for applying, to the gate node g, the voltage Vini that causes the transistor 121 to be brought into the ON state at the beginning of the compensation period (D).

In the initialization period (A2) of each of the horizontal scanning periods (H), the control signal /Gini is at the L level, the control signal Gref is at the H level, and the control signal Gcp is at the L level. Thus, the transistor 68 is in the ON state. The transmission gate 73 is in the ON state. The transmission gate 72 is in the OFF state.

In addition, in the initialization period (A2) of the horizontal scanning period (H) in which the i-th row is selected, the scanning signal /Gwr(i) is at the L level, the control signal /Gcmp(i) is at the H level, the control signal /Gel(i) is at the H level, the control signal /Gcmp(i) is at the H level, the control signal /Gel(i) is at the H level, and the control signal /Gorst(i) is at the L level. Thus, at the pixel circuit 110, the transistor 122 is in the ON state, the transistors 123 and 124 are in the OFF state, and the transistor 125 is in the ON state.

Figure 21:
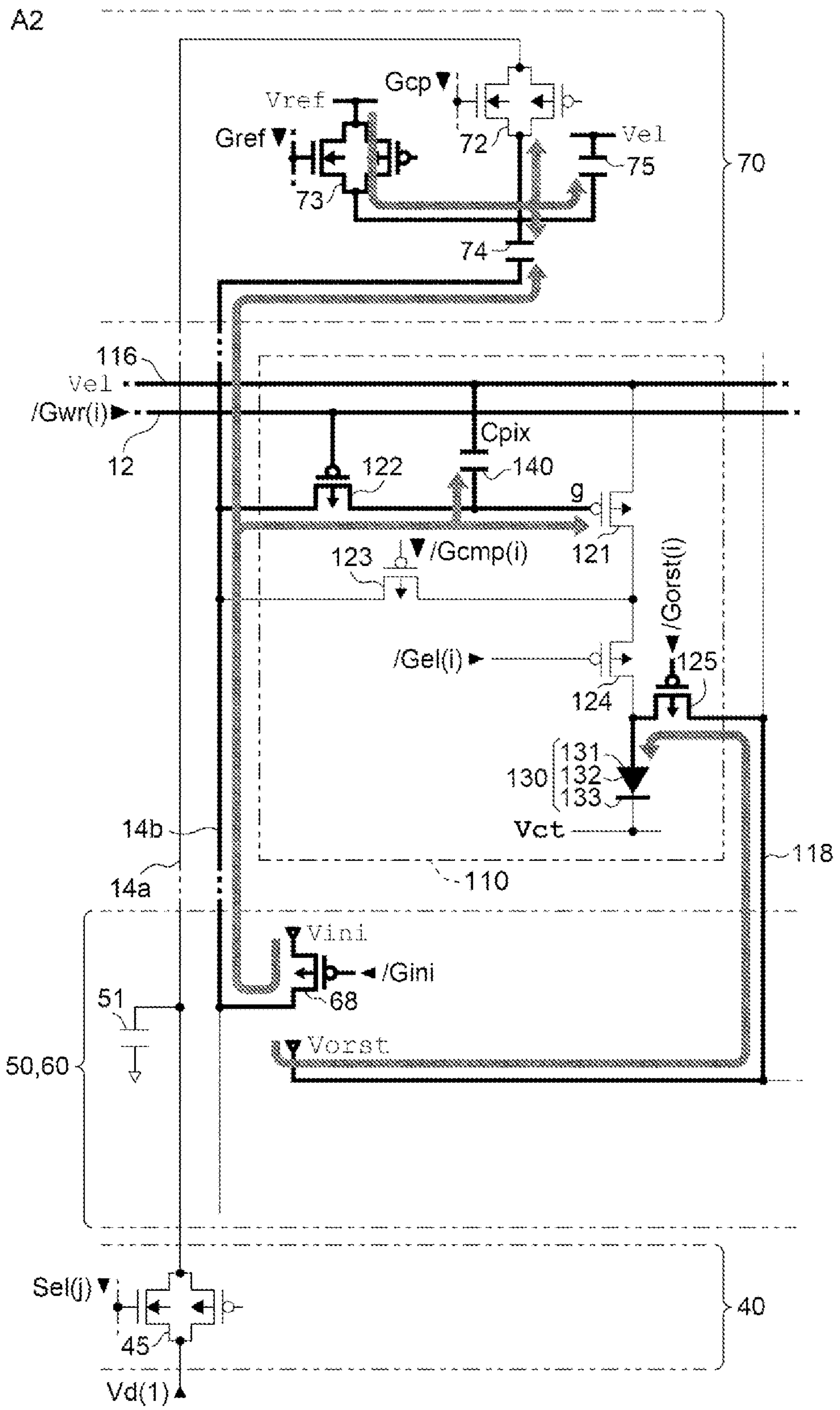
FIG. 21 is a diagram used to explain operation of the electro-optical device.

Thus, in the initialization period (A2), as illustrated in FIG. 21, the voltage Vref is applied to one end of the capacitance element 74, one end of the capacitance element 75, and the output terminal of the transmission gate 72.

At this pixel circuit 110, the voltage Vini is applied to one end of the capacitance element 140 and the gate node g of the transistor 121 sequentially through the transistor 68, the data line **14*b*, and the transistor 122. Thus, the voltage (Vel−Vini) is held across the gate node and the source node of the transistor 121**.

Furthermore, the voltage Vini is applied through the data line **14*b* to the other end of the capacitance element 74, and hence, this capacitance element 74** is charged with a voltage |Vini−Vref|.

At this pixel circuit 110, the reset voltage Vorst is applied, sequentially through the power supplying line 118 and the transistor 125, to the pixel electrode 131 that is the anode of the OLED 130. With this configuration, the voltage held by the capacitor component of the OLED 130 is reset. Specifically, the voltage corresponding to an electric current flowing through this OLED 130 in the light emission period (G) is reset.

In the compensation period (D) of each of the horizontal scanning periods (H), the control signal /Gini is at the H level, the control signal Gref is at the H level, and the control signal Gcp is at the L level. Thus, the transistor 68 changes into the OFF state. The transmission gate 73 maintains the ON state. The transmission gate 72 maintains the OFF state.

In addition, in the compensation period (D) of the horizontal scanning period (H) in which the i-th row is selected, the scanning signal /Gwr(i) is at the L level, the control signal /Gcmp(i) is at the L level, the control signal /Gel(i) is at the H level, and the control signal /Gorst(i) is at the L level.

Thus, at the pixel circuit 110, the transistor 122 maintains the ON state, the transistor 123 changes into the ON state, the transistor 124 maintains the OFF state, and the transistor 125 maintains the ON state.

Figure 22:
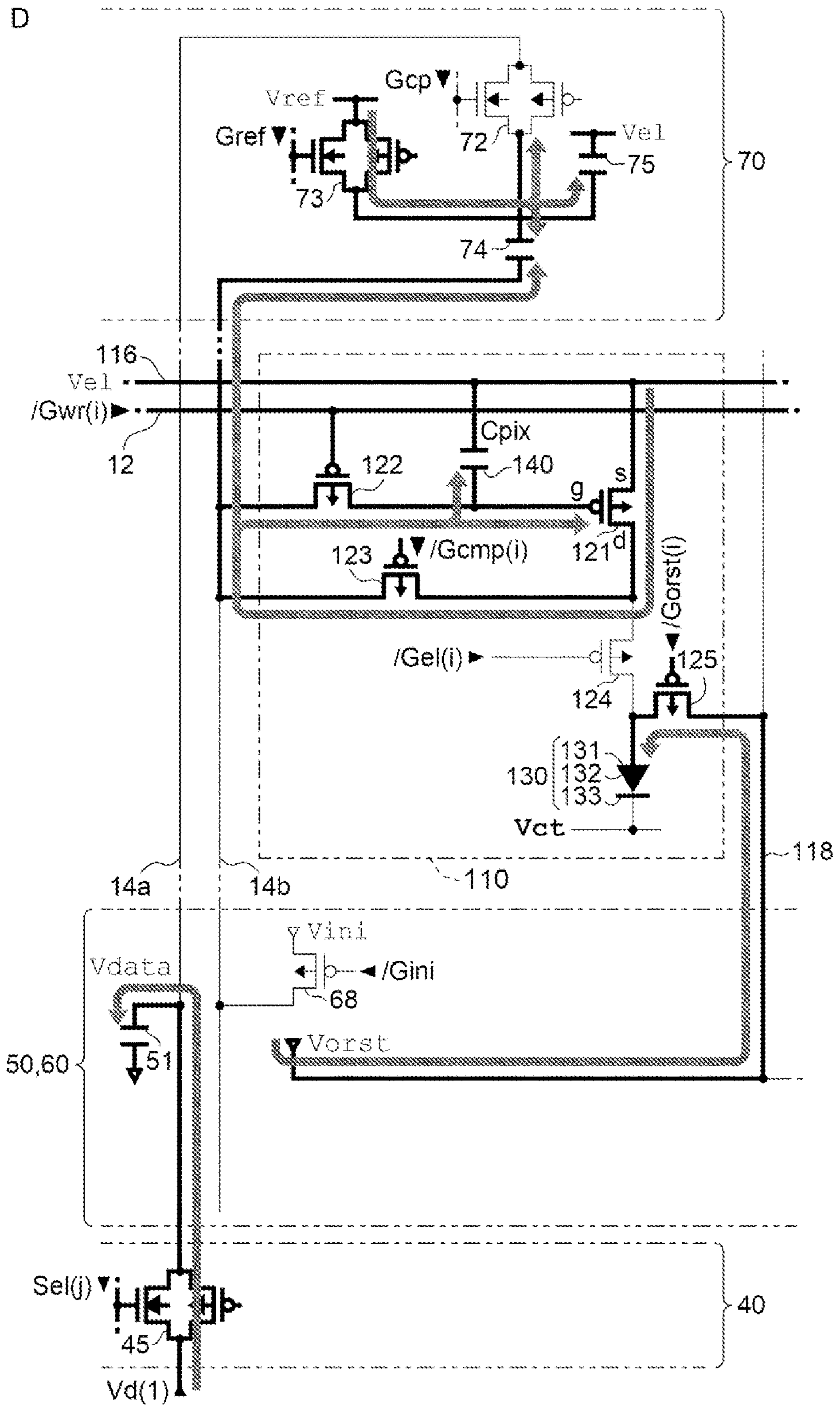
FIG. 22 is a diagram used to explain operation of the electro-optical device.

Thus, in the compensation period (D), as illustrated in FIG. 22, one end of the capacitance element 74, one end of the capacitance element 75, and the output terminal of the transmission gate 72 are maintained at the voltage Vref.

At this pixel circuit 110, the capacitance element 140 is in a state of holding the voltage (Vel−Vini) across the gate node and the source node of the transistor 121 in the initialization period (A2). In this state, when the transistors 122 and 123 are in the ON state, this transistor 121 is in a diode coupled state. Thus, the gate node g of this transistor 121 converges so as to approach the voltage (Vel−Vth) corresponding to the threshold voltage Vth.

In addition, in the compensation period (D), the data line **14*b* and the other end of the capacitance element 74 also converge so as to approach the voltage (Vel−Vth), and hence, the capacitance element 74** is charged with a voltage Vel−Vth−Vref|.

Note that, in the compensation period (D), at the pixel circuit 110, the transistor 125 maintains the ON state, and hence, the reset voltage Vorst is applied to the pixel electrode 131.

In the compensation period (D), the control signals are Sel(1) to Sel(q) sequentially and exclusively brought at the H level. In addition, when, for example, a control signal Sel(j) from among the control signals Sel(1) to Sel(q) is at the H level, the data-signal outputting circuit 30 outputs data signals Vd(1) to Vd(3) for three pixels corresponding to intersections of the scanning line 12 at the i-th row and the data lines 14*b* that belong to the j-th group. As the control signals Sel(1) to Sel(q) are sequentially and exclusively brought at the H level, the capacitance elements 51 corresponding to the first column to the (3q)-th column each hold a voltage of a data signal corresponding to each of the pixels. FIG. 22 illustrates a state in which the control signal Sel(j) corresponding to the j-th group to which the pixel circuit 110 belongs is at the H level in the compensation period (D), and the capacitance element 51 holds the voltage Vdata of the data signal Vd(1).

In the gate writing period (E) of each of the horizontal scanning periods (H), the control signal /Gini is at the H level, the control signal Gref is at the L level, and the control signal Gcp is at the H level. Thus, the transistor 68 maintains the OFF state. The transmission gate 73 changes into the OFF state. The transmission gate 72 changes into the ON state.

In addition, in the gate writing period (E) of the horizontal scanning period (H) in which the i-th row is selected, the scanning signal /Gwr(i) is at the L level, the control signal /Gcmp(i) is at the H level, the control signal /Gel(i) is at the H level, and the control signal /Gorst(i) is at the L level.

Thus, at the pixel circuit 110, the transistor 122 maintains the ON state, the transistor 123 changes into the OFF state, the transistor 124 maintains the OFF state, and the transistor 125 maintains the ON state.

Figure 23:
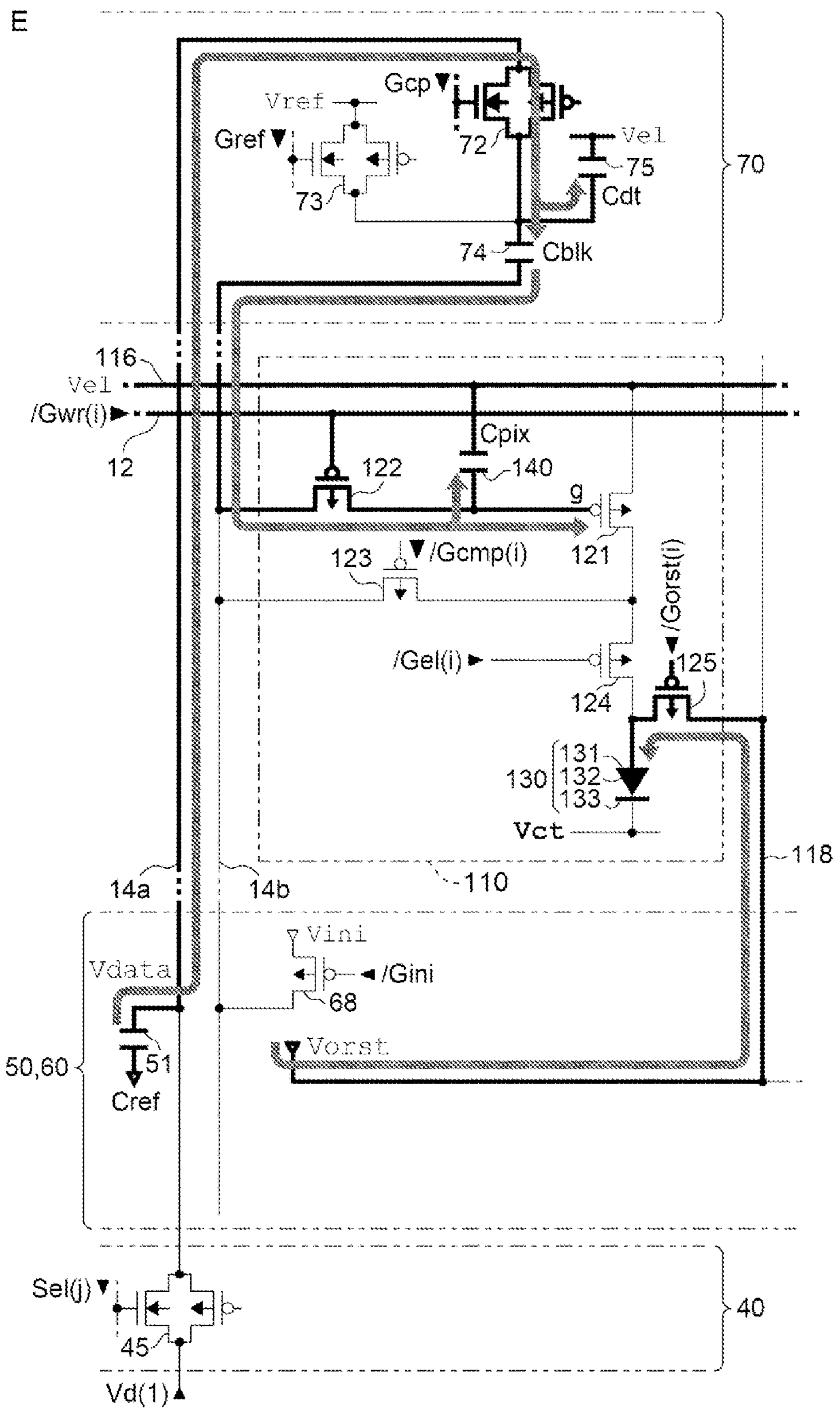
FIG. 23 is a diagram used to explain operation of the electro-optical device.

Thus, in the gate writing period (E) of the horizontal scanning period (H) in which the i-th row is selected, one end of the capacitance element 74 changes from the voltage Vref in accordance with a voltage held at one end of the capacitance element 51, as illustrated in FIG. 23. This voltage change propagates to the gate node g sequentially through the capacitance element 74, the data line 14*b*, and the transistor 122. The capacitance element 140 holds a voltage of the gate node g after this change.

Note that, in the gate writing period (E), at the pixel circuit 110, the transistor 125 maintains the ON state, and hence, the reset voltage Vorst is applied to the pixel electrode 131.

In the drain writing period (F) of each of the horizontal scanning periods (H), the control signal /Gini is at the H level, the control signal Gref is at the L level, and the control signal Gcp is at the H level. Thus, the transistor 68 maintains the OFF state. The transmission gate 73 maintains the OFF state. The transmission gate 72 maintains the ON state.

In addition, in the drain writing period (F) of the horizontal scanning period (H) in which the i-th row is selected, the scanning signal /Gwr(i) changes into the H level, the control signal /Gcmp(i) changes into the L level, and the control signal /Gel(i) maintains the H level.

Thus, at the pixel circuit 110, the transistor 122 changes into the OFF state, the transistor 123 changes into the ON state, and the transistor 124 maintains the OFF state.

Figure 24:
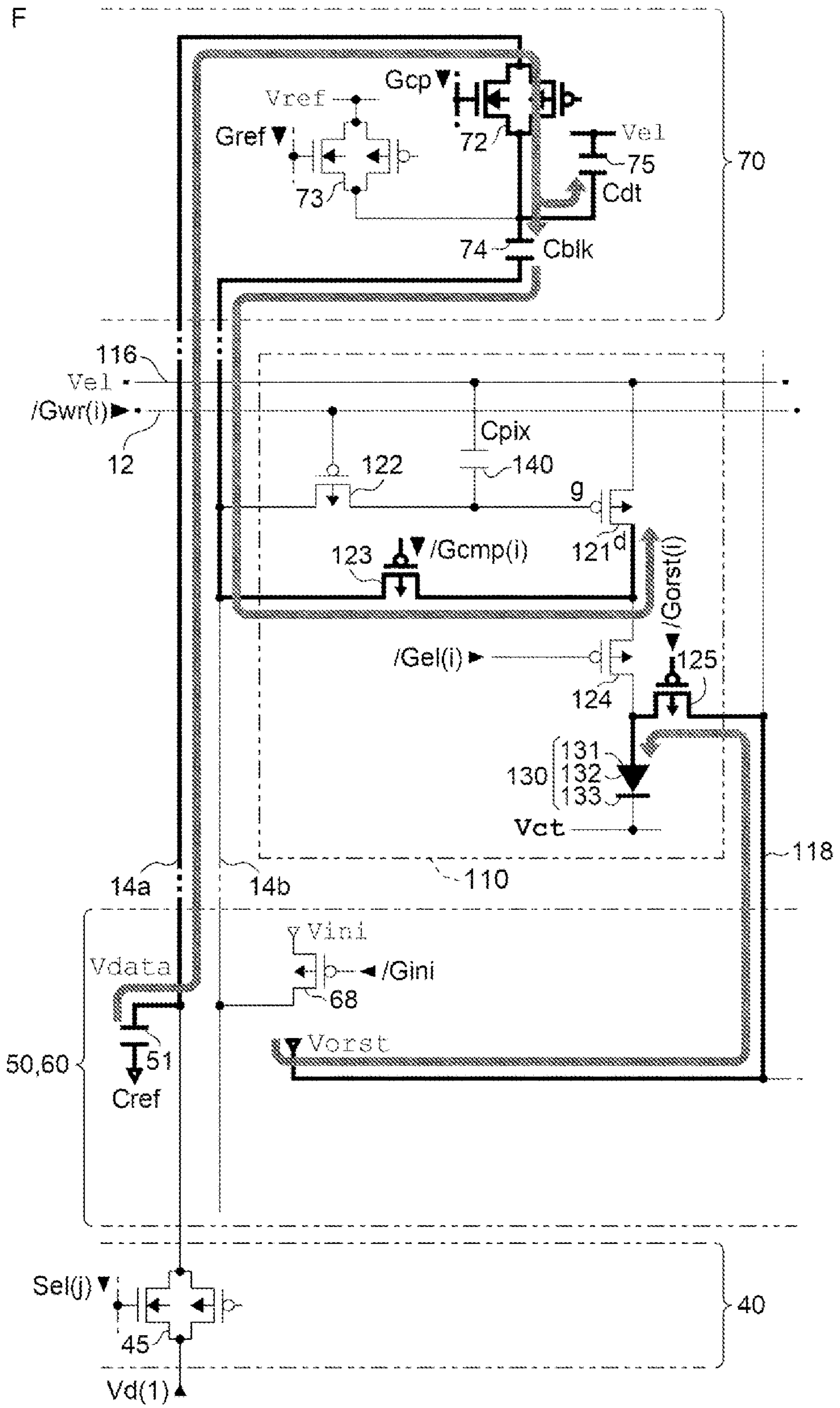
FIG. 24 is a diagram used to explain operation of the electro-optical device.

Thus, in the drain writing period (F) of the horizontal scanning period (H) in which the i-th row is selected, a voltage at the other end of the capacitance element 74, that is, the same voltage as the gate node g of the transistor 121 in the previous gate writing period (E) is applied to the drain node d of the transistor 121 sequentially through the data line 14*b* and the transistor 123 that is at the ON state, as illustrated in FIG. 24.

Figure 25:
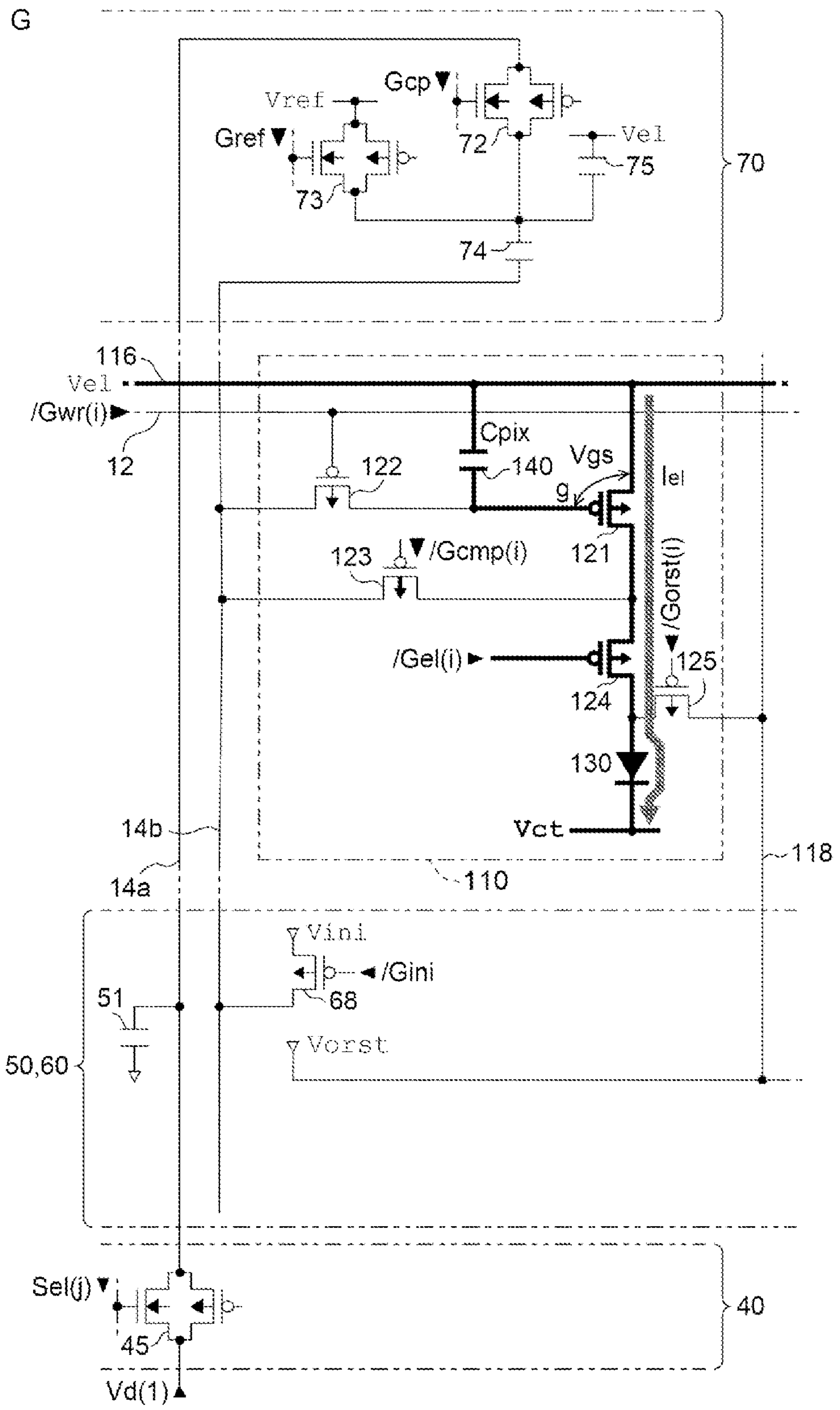
FIG. 25 is a diagram used to explain operation of the electro-optical device.

After the end of the drain writing period (F), the period becomes the light emission period (G). As in the first embodiment, in the second embodiment, the control signal /Gel(i) in the light emission period for the i-th row is at the L level. Thus, the transistor 121 causes the current Iel corresponding to the voltage Vgs and receiving restriction by a resistance between the source and the drain of the transistor 124 to flow through the OLED 130, as illustrated in FIG. 25. With this configuration, the OLED 130 emits light at luminance corresponding to the current Iel.

As in the first embodiment, in the second embodiment, in the drain writing period (F), the same voltage as that at the gate node g of the transistor 121 is applied to the drain node d of the transistor 121. This makes it possible to suppress the floating black and also suppress occurrence of display irregularity when the gray scale level is approximately at a middle level or higher.

In addition, in the second embodiment, the initialization period (B) or the initialization period (C) in the first embodiment is not provided. This makes it possible to increase the length of the compensation period (D) accordingly.

When the compensation period (D) is short, there is a possibility that the voltage Vgs across the gate node and the source node of the transistor 121 does not yet converge on the threshold voltage at the end period of this compensation period (D). In a situation where the voltage Vgs does not converge on the threshold voltage, it is not possible to accurately compensate the threshold value of the transistor 121. This leads to a variation in luminance of the OLED 130 between individual pixel circuits 110, which results in a deterioration in the display quality.

With the second embodiment, it is possible to increase the length of the compensation period (D). This makes it possible to more accurately compensate the threshold value of the transistor 121, as compared with the first embodiment. Thus, with the second embodiment, it is possible to further suppress the deterioration in the display quality, as compared with the first embodiment.

Note that, in the second embodiment, the period in which the reset voltage Vorst is applied to the pixel electrode 131 that is one end of the OLED 130 is made out of the initialization period (A2), the compensation period (D), and the gate writing period (E). However, this period is not limited to these periods. It is only necessary that the period in which the reset voltage Vorst is applied to the pixel electrode 131 is a period prior to the light emission period (G). Thus, this period may be, for example, a period comprised of a portion of the initialization period (A2), the compensation period (D), and the gate writing period (E), or may be the drain writing period (F).

However, it is preferable to include the horizontal scanning period (A2), for example, from the viewpoint in which, in the horizontal scanning period (H) in which the i-th row is selected, electric charge held at the pixel electrode 131 is quickly reset to extinguish the light of the OLED 130.

Modification Example

The first embodiment and the second embodiment (hereinafter, referred to as the embodiment or the like) given above as examples can be modified in a various manner. Specific modification modes that can be applied to the embodiment will be given below as examples. Two or more given modes selected from the examples described below may be combined as long as no contradiction arises due to the combination.

Making Control Signals /Gel(1) to /Gel(m) Ternary

In the embodiment or the like, the control signals /Gel(1) to /Gel(m) are binary signals having an L level or an H level.

Figure 26:
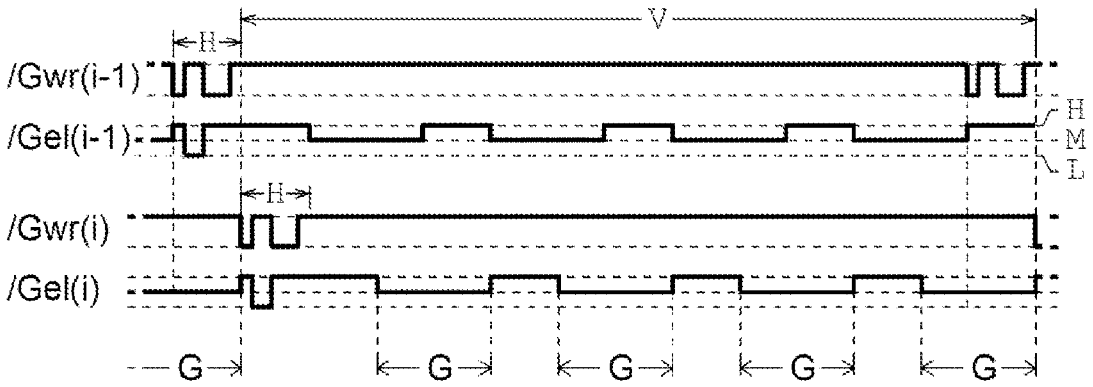
FIG. 26 is a timing chart illustrating another example of a control signal /Gel(i).

However, as illustrated in FIG. 26, an M level is provided between the L level and the H level, and in the light emission period (G), the level is the M level.

FIG. 26 illustrates an example in which, after the horizontal scanning period (H) in which the i-th row is selected, the light emission period (G) in which the control signal /Gel(i) is at the M level happens four times at equal intervals, and the lengths of time of the period in which the level is at the M level are set to be almost equal.

Even when the control signals /Gel(1) to /Gel(m) are ternary signals made of the L, M, and H levels, it is possible to suppress occurrence of the floating black as with the embodiment.

Note that, in FIG. 26, one frame (V) is illustrated in order to indicate the length of period from a time when horizontal scanning is performed to the i-th row to a time when the next horizontal scanning is performed to the i-th row, whereas no illustration is given as to a period from the start to the end of the vertical scanning period.

The reason that the M level is applied to the gate node of the transistor 124 is to operate this transistor 124 in a saturation region, thereby maintaining a constant current property of the transistor 121 even if the current-voltage characteristics at the OLED 130 changes over time.

Specifically, when the current Iel flows, the OLED 130 emits light at luminance corresponding to this current Iel. In the embodiment or the like, at the pixel circuit 110, a voltage of the gate node g of the transistor 121 is held by the capacitance element 140. This secures the constant current property of the current Iel flowing from the power supplying line 116 through the OLED 130.

However, the OLED 130 has a characteristic in which the element property changes as the light emitting time increases, and this gradually increases the potential of the anode (pixel electrode 131) required to cause a constant electric current to flow. As the potential of the anode of the OLED 130 increases, the equilibrium point of the potential of a path from the power supplying line 116 to the common electrode 133 changes, which leads to an increase in the potential of the source node of the transistor 124, that is, the potential of the drain node of the transistor 121. As the potential of the drain node of the transistor 121 increases, a voltage between the source node and the drain node of the transistor 121 also changes, and the electric current flowing through the drain node of the transistor 121 also changes. This results in a deterioration in the constant current property of the OLED 130.

Thus, as a countermeasure against the deterioration in the constant current property in association with the change over time of the element property of the OLED 130, the M level is applied to the gate node of the transistor 124 in order to operate the transistor 124 in the saturation region.

When the transistor 124 is operated in the saturation region and the potential of the anode of the OLED 130 changes, it is the transistor 124 that directly receives the influence of this change. The transistor 121 is influenced by the change in the potential at the drain node of this transistor 124. However, the change in the electric current at the drain in the saturation region is very small. This leads to alleviating the change in the drain potential at the transistor 121 coupled to the transistor 124, and also alleviating the influence of the change in the gate potential due to the current leakage.

Addition of Capacitor Cgd_1

Furthermore, the amount ΔVdr_d of change in voltages at the drain node d of the transistor 121 due to the control signal /Gcmp changing from the L level to the H level (due to the transistor 123 changing from the ON state into the OFF state) can be expressed by the Equation 8 described above. In Equation 8, as the denominator of capacitor Cgd_1 increases, the amount ΔVdr_d of change in voltages reduces, which makes it possible to reduce the influence of push-up. That is, as the voltage Vdr_d reduces due to the reduction in the push-up, this works in a direction in which the leak current of the OLED 130 reduces, which makes it possible to suppress the floating black.

In order to increase the capacitor Cgd_1, it is only necessary that the parasitic capacitor is used, and in addition, for example, a capacitance element Cadd made out of metal/insulation body (dielectric substance)/metal or the like is further provided between the gate node g and the drain node d at the transistor 121, as illustrated with the dashed line in FIG. 13.

That is, it may be possible to employ a configuration that includes the capacitance element Cadd having one end electrically coupled to the gate node g of the transistor 121 and the other end electrically coupled to the drain node d of the transistor 121, the capacitance element Cadd including an insulation body interposed between an electrode serving as the one end and an electrode serving as the other end.

Note that the amount ΔVdr_g of change in voltages at the gate node g of the transistor 121 has been described above using Equation 9. According to Equation 9, as the amount ΔVdr_d of change in voltages reduces, the amount ΔVdr_g of change in voltages seems to also reduce. However, this results from an increase in the capacitor Cgd_1, and hence, the amount ΔVdr_g of change in voltages may increase. As described above, the increase in the voltage Vdr_g works to reduce the leak current to the OLED 130, and hence, it is possible to prevent the floating black.

Narrowing of Logical Amplitude of Control Signals /Gcmp (1) to /Gcmp

In addition, as can be understood from Equation 8, it can be understood that, as the ΔVgcmp that is a difference in potential between the L level and the H level of the control signal /Gcmp(i) reduces, the amount ΔVdr_d of change in voltages at the drain node d of the transistor 121 reduces.

Thus, the logical amplitude (difference between the H level and the L level) of the control signal /Gcmp(i) supplied to the gate node of the transistor 123 is reduced so as to be smaller than, for example, the amplitude (difference between the maximum value and the minimum value) of the control signal /Gel(i) supplied to the gate node of the transistor 124. This reduces the amount ΔVdr_d of change in voltages, which makes it possible to suppress the floating black.

Application of Reset Voltage Vorst

The first embodiment may employ a configuration in which, when the transistor 123 is turned on in the drain writing period (F), the transistor 67 is turned on to apply the reset voltage Vorst to the drain node d of the transistor 121 sequentially through the data line **14*b* and the transistor 123** that is in the ON state.

Note that, in this configuration, when the reset voltage Vorst is set to fall in a range of 0 to 1 volt as described above, it is not possible to suppress occurrence of the floating black. Thus, it may be possible to adjust the reset voltage Vorst to fall, for example, in a range of approximately 5 to 6 volts. With such a configuration, it is possible finely adjust the voltage applied to the drain node d in the drain writing period (F) while checking the display state. This makes it possible to more effectively suppress the occurrence of the floating black.

Others

The channel type of the transistors 66, 67, 68, and 121 to 125 is not limited to that in the embodiment or the like. For example, it is preferable that the transistor 67 in the first embodiment is of N-channel type. The reason for this is because the reset voltage Vorst supplied through the power supplying line 118 is a low voltage close to the L level.

In the configuration in which the transistor 67 is of N-channel type, it is only necessary to employ a configuration in which a control signal Gorst having a positive logic is supplied to the gate node. With the configuration in which the transistor 67 is of N-channel type, it is possible to make the data line 14*b* have the reset voltage Vorst in a short period of time, as compared with the configuration in which this transistor 67 is of P-channel type.

Furthermore, in the second embodiment, the transistor 125 of the pixel circuit 110 may be of N-channel type. In the configuration in which the transistor 125 is of N-channel type, it is only necessary to employ a configuration in which signals obtained through logical inversion of /Gorst(1) to /Gorst(m) are supplied to the gate node of the transistor 125 of the corresponding pixel circuit 110 in each of the first to m-th rows.

The transmission gates 45, 72, and 73 may be replaced with those of single channel type.

The source node and the drain node of each of the transistors may be swapped on an as-necessary basis depending on embodiments.

The embodiment or the like has been described using the OLED 130 as one example of the light emitting element. However, it may be possible to use other light emitting element. For example, as for the light emitting element, it may be possible to use an inorganic EL element or use an LED, mini-LED, micro LED, or the like.

Electronic Device

Next, an electronic device to which the electro-optical device 10 according to the embodiment or the like is applied will be described. The electro-optical device 10 is suitable for application with a small pixel and high definition display. Thus, a head-mounted display will be described as an example of the electronic device.

Figure 27:
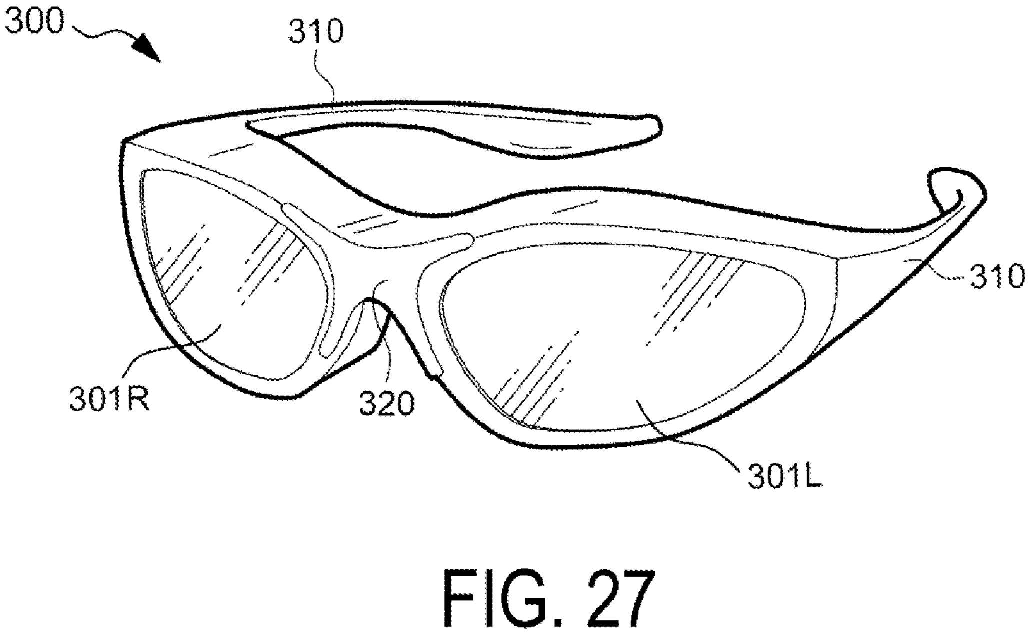
FIG. 27 is a perspective view illustrating a head-mounted display using the electro-optical device.
Figure 28:
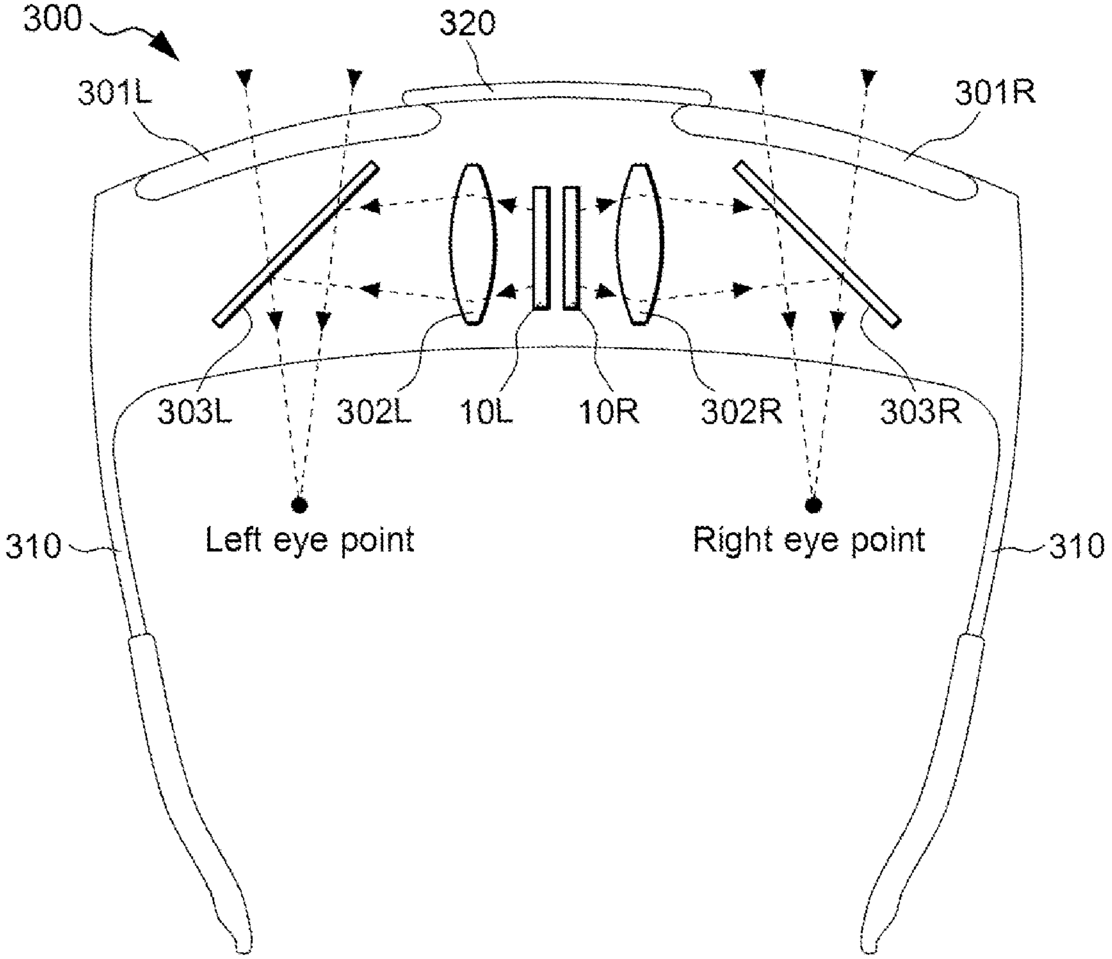
FIG. 28 is a diagram illustrating an optical configuration of the head-mounted display.

FIG. 27 is a diagram illustrating the external appearance of a head-mounted display. FIG. 28 is a diagram illustrating an optical configuration of the display.

First, as illustrated in FIG. 27, the head-mounted display 300 includes a temple 310, a bridge 320, and lenses 301L and 301R as with typical eyeglasses in terms of the external appearance. In addition, as illustrated in FIG. 28, the head-mounted display 300 includes a left-eye electro-optical device 10L and a right-eye electro-optical device 10R provided in the vicinity of the bridge 320 and at the back (at the lower side in the drawing) of the lenses 301L and 301R.

An image display surface of the electro-optical device 10L is disposed so as to be at the left in FIG. 28. With this configuration, the display image from the electro-optical device 10L exits through an optical lens 302L in the direction of nine o'clock in the drawing. A half mirror 303L reflects the display image from the electro-optical device 10L toward the direction of six o'clock while allowing light entering from the direction of 12 o'clock to pass through. An image display surface of the electro-optical device 10R is disposed so as to be at the right that is opposite to the electro-optical device 10L. With this configuration, the display image from the electro-optical device 10R exits through an optical lens 302R in the direction of three o'clock in the drawing. A half mirror 303R reflects the display image from the electro-optical device 10R toward the direction of six o'clock while allowing light entering from the direction of 12 o'clock to pass through.

With this configuration, a wearer of the head-mounted display 300 can observe the display images by the electro-optical devices 10L and 10R in a see-through state in which the display images by the electro-optical devices 10L and 10R overlap with the outside.

In addition, in this head-mounted display 300, of images for both eyes with parallax, an image for a left eye is displayed by the electro-optical device 10L, and an image for a right eye is displayed by the electro-optical device 10R. This makes it possible to cause a wearer to sense the displayed images as an image displayed having a depth or a three dimensional effect.

Note that, in addition to the head-mounted display 300, it is possible to apply an electronic device including the electro-optical device 10 to an electronic viewing finder in a video camera, a lens-exchangeable digital camera, or the like, a personal digital assistant, a display unit of an arm timepiece, a light bulb of a projection-type projector, or the like.

Supplementary Notes

On the basis of the description above, it is possible to obtain preferred aspects of the present disclosure, for example, in the following manner. Note that, in the following description, in order to facilitate understanding of each aspect, the reference characters attached in the drawings are also written in blankets for the purpose of convenience. However, this does not intend to limit the present disclosure to the aspects illustrated in the drawings.

Note 1

The electro-optical device (10) according to one aspect (aspect 1) includes a pixel circuit (110) provided corresponding to a scanning line (12) and a data line (14*b*), in which the pixel circuit (110) includes a first transistor (121) and a light emitting element (130), the first transistor (121) is configured to supply the light emitting element (130) with a current (Iel) corresponding to a voltage (Vgs) across a gate node of the first transistor (121) and a source node of the first transistor (121), a horizontal scanning period sequentially includes a compensation period (D), a gate writing period (E), and a drain writing period (F), in the compensation period (D), the gate node of the first transistor (121) and a drain node of the first transistor (121) are electrically coupled, and the gate node of the first transistor (121) has a voltage (Vel−Vth) corresponding to a threshold voltage of the first transistor (121), in the gate writing period (E), a voltage of the gate node of the first transistor (121) is varied from the voltage (Vel−Vth) corresponding to the threshold voltage into a voltage corresponding to luminance of the light emitting element (130), and in the drain writing period (F), a voltage corresponding to luminance of the light emitting element (130) is applied to the drain node of the first transistor (121).

With the aspect 1, the gate node and the drain node of the first transistor (121) are electrically coupled in the compensation period (D), and hence, the voltage (Vel−Vth) corresponding to the threshold voltage of this first transistor (121) is held not only at the gate node but also at the drain node with the parasitic capacitor or the like. In the gate writing period (E), due to electrical coupling of the gate node and the drain node of the first transistor (121) in the compensation period (D), voltages at the gate node as well as the drain node change from the voltage (Vel−Vth) corresponding to the threshold voltage into a voltage corresponding to luminance of the light emitting element (130). In the drain writing period (E), a voltage corresponding to the luminance of the light emitting element (130) is applied to the drain node of the first transistor (121). This makes it possible to reduce the change in voltage at this drain node. Thus, it is possible to reduce the influence of the change in voltage at this drain node on an adjacent pixel circuit, and also possible to reduce the change in voltage that influences the gate node of the first transistor at the pixel circuit itself. This makes it possible to reduce the influence on an adjacent pixel, and also possible to prevent the floating black of the pixel itself.

Note that the transistor 121 serves as one example of the first transistor, and the OLED 130 serves as one example of the light emitting element.

Note 2

In the electro-optical device (10) according to a specific aspect (aspect 2) of the aspect 1, the pixel circuit (110) includes a second transistor (122), a third transistor (123), and a fourth transistor (124), the second transistor (122) is provided between the data line (14*b*) and the gate node of the first transistor (121), and is in an ON state or an OFF state in accordance with a voltage of the scanning line (12), the third transistor (123) is provided between the data line (14*b*) and the drain node of the first transistor (121), the fourth transistor (124) is provided between the drain node of the first transistor (121) and the light emitting element (130), in the compensation period (D), the second transistor (122) and the third transistor (123) are in the ON state, in the gate writing period (E), the second transistor (122) is in the ON state, and the third transistor (123) is in the OFF state, and in the drain writing period (F), the second transistor (122) is in the OFF state, and the third transistor (123) is in the ON state.

In the aspect 2, in the compensation period (D), the third transistor (123) is in the ON state to cause the first transistor (121) to be in a diode coupled state. In the gate writing period (E), the second transistor (122) is in the ON state, which cause a voltage corresponding to luminance of the light emitting element (130) to be applied to the gate node of the first transistor (121). In the drain writing period (E), a voltage corresponding to luminance of the light emitting element (130) is applied to the drain node of the first transistor (121). Thus, with the aspect 2, the number of transistors in the pixel circuit (110) is only “4”, which makes it possible to avoid a complicated configuration.

Note that the transistor 122 serves as one example of the second transistor. The transistor 123 serves as one example of the third transistor. The transistor 124 serves as one example of the fourth transistor.

Note 3

In the electro-optical device (10) according to a specific aspect (aspect 3) of the aspect 1, the pixel circuit (110) includes a second transistor (121), a third transistor (123), a fourth transistor (124), and a fifth transistor (125), the second transistor (122) is provided between the data line (14*b*) and the gate node of the first transistor (121) and in an ON state or OFF state in accordance with a voltage of the scanning line (12), the third transistor (123) is provided between the data line (14*b*) and the drain node of the first transistor (121), the fourth transistor (124) is provided between the drain node of the first transistor (121) and the light emitting element (130), the fifth transistor (125) is provided between one end of the light emitting element (130) and a power supplying line (118) configured to supply a reset voltage (Vorst), in the compensation period (D), the second transistor (122) and the third transistor (123) are in the ON state, in the gate writing period (E), the second transistor (122) is in the ON state, and the third transistor (123) is in the OFF state, and in the drain writing period (F), the second transistor (122) is in the OFF state, and the third transistor (123) is in the ON state.

With the aspect 3, it is possible to lengthen the compensation period (D) in which the third transistor (123) is in the ON state.

Note that the transistor 125 serves as one example of the fifth transistor.

Note 4

In the electro-optical device (10) according to a specific aspect (aspect 4) of the aspect 2 or 3, the pixel circuit (110) includes a capacitance element (Cadd) in which an insulation body is interposed between a first electrode and a second electrode, the first electrode is electrically coupled to the gate node of the first transistor (121), and the second electrode is electrically coupled to the drain node of the first transistor (121).

With the aspect 4, it is possible to reduce the change in voltage at the drain node of the first transistor (121) when the third transistor changes from the ON state to the OFF state.

Note 5

In the electro-optical device (10) according to a specific aspect (aspect 5) of the aspects 2 to 4, in the pixel circuit 110, a logical amplitude of a control signal /Gcmp(i) supplied to a gate node of the third transistor (123) is smaller than an amplitude of a control signal /Gel(i) supplied to a gate node of the fourth transistor (124).

With the aspect 5, it is possible to reduce the change in voltage at the drain node of the first transistor (121) when the third transistor changes from the ON state to the OFF state, as with the aspect 4.

Note 6

An electronic device (300) according to an aspect 6 includes the electro-optical device (10) according to any one of the aspects 1 to 5. With the aspect 6, it is possible to suppress the floating black, which makes it possible to suppress a deterioration in the display quality.

Note 7

The electro-optical device (10) according to the aspect 1 can be expressed as a method of driving the electro-optical device (10) as in an aspect 7. That is, a method of driving the electro-optical device (10) according to the aspect 7 is a method of driving the electro-optical device (10) including a pixel circuit (110) provided corresponding to a scanning line (12) and a data line (14*b*), in which the pixel circuit (110) includes a transistor (121) and a light emitting element (130), the transistor (121) is configured to supply the light emitting element (130) with a current (Iel) corresponding to a voltage (Vgs) across a gate node of the transistor and a source node of the transistor (121), the method being a method in which a horizontal scanning period (H) sequentially includes a compensation period (D), a gate writing period (E), and a drain writing period (F), in the compensation period (D), the gate node of the transistor (121) and a drain node of the transistor (121) are electrically coupled, and a voltage of the gate node of the transistor (121) is a voltage (Vel−Vth) corresponding to a threshold voltage of the transistor (121), in the gate writing period (E), a voltage of the gate node of the first transistor (121) is varied from the voltage (Vel−Vth) corresponding to the threshold voltage into a voltage corresponding to luminance of the light emitting element (130), and in the drain writing period (F), a voltage corresponding to luminance of the light emitting element (130) is applied to the drain node of the first transistor (121).

What is claimed is:

1. An electro-optical device comprising:

a pixel circuit provided corresponding to a scanning line and a data line, wherein the pixel circuit includes:

a first transistor being configured to supply the light emitting element with a current corresponding to a voltage between a gate node of the first transistor and a source node of the first transistor;

a second transistor electrically connecting the data line and the gate node of the first transistor, and is in an ON state or an OFF state in accordance with a voltage of the scanning line;

a third transistor electrically connecting the data line and the drain node of the first transistor, a fourth transistor electrically connecting the drain node of the first transistor and the light emitting element; and a light emitting element, a horizontal scanning period sequentially includes a compensation period, a first period, and a second period, in the compensation period, the second transistor and the third transistor are in the ON state, the gate node of the first transistor and a drain node of the first transistor are electrically coupled, and a voltage of the gate node of the first transistor is a voltage corresponding to a threshold voltage of the first transistor, in the first period, the second transistor is in the ON state, and the third transistor is in the OFF state, a voltage corresponding to luminance of the light emitting element is applied to the gate node of the first transistor and the voltage of the gate node of the first transistor is varied from the voltage corresponding to the threshold voltage to the voltage corresponding to luminance of the light emitting element, in the second period, the second transistor is in the OFF state, and the third transistor is in the ON state, the voltage corresponding to the luminance of the light emitting element is applied to the drain node of the first transistor.

2. The electro-optical device according to claim 1, wherein the pixel circuit includes a fifth transistor electrically connecting one end of the light emitting element and a power supplying line configured to supply a reset voltage.

3. The electro-optical device according to claim 1, wherein the pixel circuit includes a capacitance element in which an insulation body is interposed between a first electrode and a second electrode, the first electrode is electrically coupled to the gate node of the first transistor, and the second electrode is electrically coupled to the drain node of the first transistor.

4. The electro-optical device according to claim 1, wherein a logical amplitude of a control signal supplied to a gate node of the third transistor is smaller than an amplitude of a control signal supplied to a gate node of the fourth transistor.

5. An electronic device comprising the electro-optical device according to claim 1.

6. A method of driving an electro-optical device including a pixel circuit provided corresponding to a scanning line and a data line, the pixel circuit including a first transistor, a second transistor, a third transistor, a fourth transistor and a light emitting element, the first transistor being configured to supply the light emitting element with a current corresponding to a voltage between a gate node of the first transistor and a source node of the first transistor, wherein the second transistor electrically connect the data line and the gate node of the first transistor and in an ON state or OFF state in accordance with a voltage of the scanning line, the third transistor electrically connects the data line and the drain node of the first transistor, the fourth transistor electrically connects the drain node of the first transistor and the light emitting element, a horizontal scanning period sequentially includes a compensation period, a first period, and a second period, in the compensation period, the second transistor and the third transistor are in the ON state, the gate node of the first transistor and the drain node of the first transistor are electrically coupled, and a voltage of the gate node of the first transistor is a voltage corresponding to a threshold voltage of the first transistor, in the first period, the second transistor is in the ON state, and the third transistor is in the OFF state, a voltage corresponding to luminance of the light emitting element is applied to the gate node of the first transistor and the voltage of the gate node of the first transistor is varied from the voltage corresponding to the threshold voltage to the voltage corresponding to luminance of the light emitting element, and in the second period, the second transistor is in the OFF state, and the third transistor is in the ON state, the voltage corresponding to the luminance of the light emitting element is applied to the drain node of the first transistor.

* * * * *